United States Patent
Silverbrook

(10) Patent No.: US 7,012,620 B1
(45) Date of Patent: Mar. 14, 2006

(54) FULL-COLOR DESKTOP PUBLISHING SYSTEM

(75) Inventor: Kia Silverbrook, Woollahra (AU)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 09/369,281

(22) Filed: Aug. 6, 1999

Related U.S. Application Data

(62) Division of application No. 07/744,522, filed on Aug. 13, 1991, now Pat. No. 6,020,894.

(30) Foreign Application Priority Data

| Aug. 16, 1990 | (AU) | ............................................. PK1784 |
| Aug. 16, 1990 | (AU) | ............................................. PK1785 |
| Nov. 19, 1990 | (AU) | ............................................. PK3418 |

(51) Int. Cl.
   *G06F 15/00* (2006.01)

(52) U.S. Cl. .................................................... 345/619

(58) Field of Classification Search ................. 345/433, 345/435, 419, 420, 619, 625, 628
See application file for complete search history.

(56) References Cited

U.S. PATENT DOCUMENTS

| 4,271,476 A | * | 6/1981 | Lotspiech ................... 382/235 |
| 4,568,983 A | | 2/1986 | Bobick ....................... 358/409 |
| 4,679,038 A | * | 7/1987 | Bantz et al. ................. 340/721 |
| 4,862,154 A | * | 8/1989 | Gonzalez-Lopez .......... 340/747 |
| 4,896,275 A | * | 1/1990 | Jackson ...................... 364/519 |
| 5,129,011 A | * | 7/1992 | Nishikawa et al. ......... 382/173 |
| 5,191,406 A | | 3/1993 | Brandestini ................. 348/111 |
| 5,329,616 A | | 7/1994 | Silverbrook ................ 345/555 |
| 5,357,601 A | | 10/1994 | Kagawa ....................... 345/629 |
| 5,428,464 A | | 6/1995 | Silverbrook ................ 358/501 |
| 5,459,823 A | | 10/1995 | Silverbrook et al. ........ 358/444 |
| 5,509,115 A | * | 4/1996 | Butterfield et al. ......... 345/418 |
| 5,526,128 A | * | 6/1996 | Fujiki et al. ................. 358/444 |
| 5,801,716 A | * | 9/1998 | Silverbrook ................ 345/506 |
| 5,917,947 A | | 6/1999 | Ishida et al. ................ 382/232 |
| 5,995,120 A | * | 11/1999 | Dye ........................... 345/509 |
| 6,020,894 A | * | 2/2000 | Silverbrook ................ 345/433 |

FOREIGN PATENT DOCUMENTS

| AU | 34850/89 | 9/1989 |
| DE | 3 735 349 | 4/1988 |
| EP | 0 310 228 | 4/1989 |
| EP | 0 326 137 | 8/1989 |
| JP | 1-311379 | 12/1989 |

OTHER PUBLICATIONS

Vivian, et al., "Towards a World Standard for Still Image Transmission", International Broadcasting Convention, pp. 260–267 (Sep. 1988).

* cited by examiner

*Primary Examiner*—Phu K. Nguyen
(74) *Attorney, Agent, or Firm*—Fitzpatrick, Cella, Harper & Scinto

(57) ABSTRACT

A full-color desk top publishing (DTP) system is disclosed that includes a general purpose computer system, a full-color high resolution graphics system and peripheral devices such as a color laser copier including a scanner and a printer, a workscreen display and user inputs such as a digitizer and a keyboard. The DTP system can generate graphics images in bands across a page image with the images being stored in DRAM as compressed images using ADCT compression and the JPEG standard. Numerous image processing and creation steps are also disclosed.

7 Claims, 4 Drawing Sheets

BAND1     BAND2     BAND3     BAND4

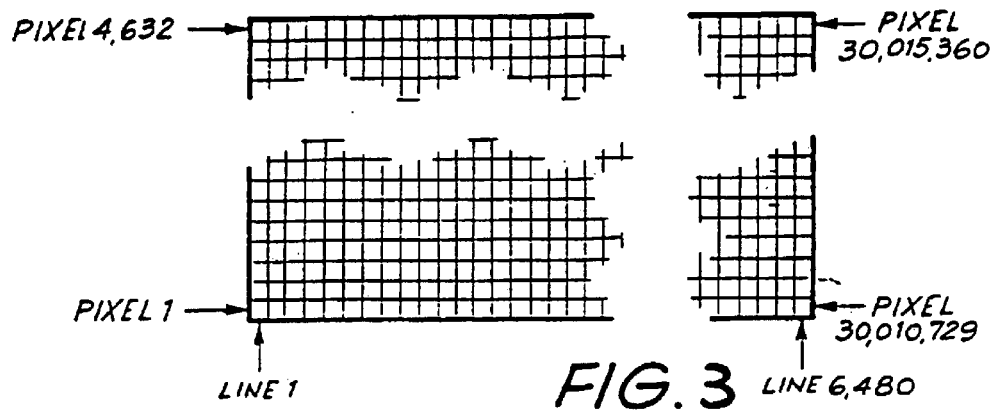
FIG. 3
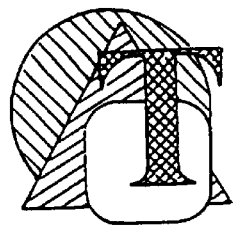
FIG. 4
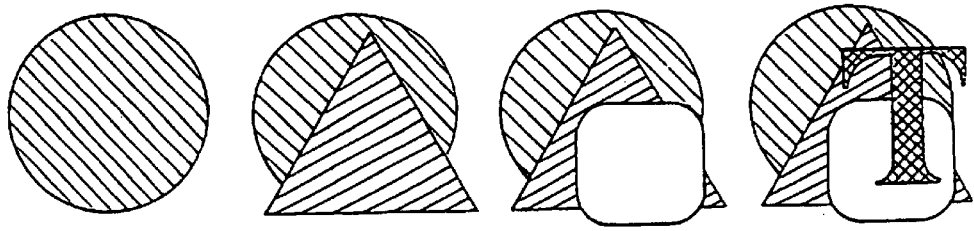
FIG. 5
FIG. 6
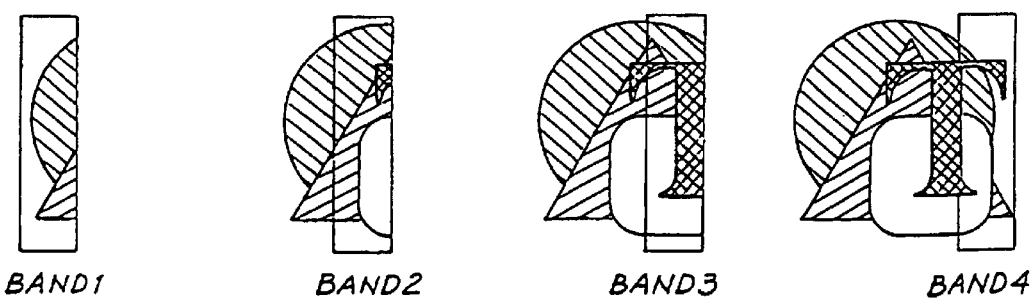

FULL-COLOR DESKTOP PUBLISHING SYSTEM

This is a divisional of parent Application No. 07/744,552 filed Aug. 13, 1991 now U.S. Pat. No. 6,020,894.

BACKGROUND OF THE INVENTION

1. Field of the Invention

The present invention relates to computer graphics and, in particular, discloses a full colour desk top publishing system capable of creating and printing A3 size true colour images at 400 dots per inch (dpi).

2. Description of the Related Arts

DTP systems such as VENTURA PUBLISHER and PAGEMAKER are well known and provide for document and image creation generally in personal computer systems with the aid of a mouse-like input device and a half-tone laser printer (black on white).

However, there exists a need for DTP systems to operate in full colour and to provide greater versatility for image creation and editing. Full colour DTP systems have been constructed but those known arrangements are expensive when high quality is demanded.

SUMMARY OF THE INVENTION

It is an object of the present invention to substantially overcome, or ameliorate some or all of the disadvantages of the prior art.

In accordance with one aspect of the present invention there is disclosed a method of creating an image, said method comprising the steps of:

(a) forming bands of;the image as follows:
  (1) rendering a band of the image from objects in a display list;
  (2) compressing the band of the image;
  (3) storing the compressed band of the image; and
  (4) repeating steps (1) to (3) for each band of the image;
(b) editing a selected band of the image by:
  (1) expanding the selected band of the stored image;
  (2) rendering an additional band of the image from additional objects in said display list;
  (3) compositing the additional band with the selected band to form an edited selected band of the image;
  (4) compressing the edited selected band of the image;
  (5) storing the compressed edited selected band;
(c) repeating steps (b)(1)–(b)(5) for each band of the image; and
(d) repeating steps (b) and (c) as required to create a final edited image.

In accordance with another embodiment of the present invention there is disclosed a method of creating an image characterized in that said image is formed as a plurality of bands, in which multiple passes over said bands are used to edit said image, said bands being stored as compressed image data.

The present invention is not limited to the above embodiments and various changes and modifications can be made within the spirit and scope of the present invention.

BRIEF DESCRIPTION OF THE DRAWINGS

FIG. 3 is a graphical representation of a page image;

FIG. 4 shows a layered graphics image; and

FIG. 5 illustrates the formation of the layers of FIG. 4;

FIG. 6 shows the band rendering of the image of FIG. 4.

DESCRIPTION OF THE PREFERRED EMBODIMENTS

Tables 1 to 21 show various preferred application examples utilizing a number of processing steps.

Figure 1:
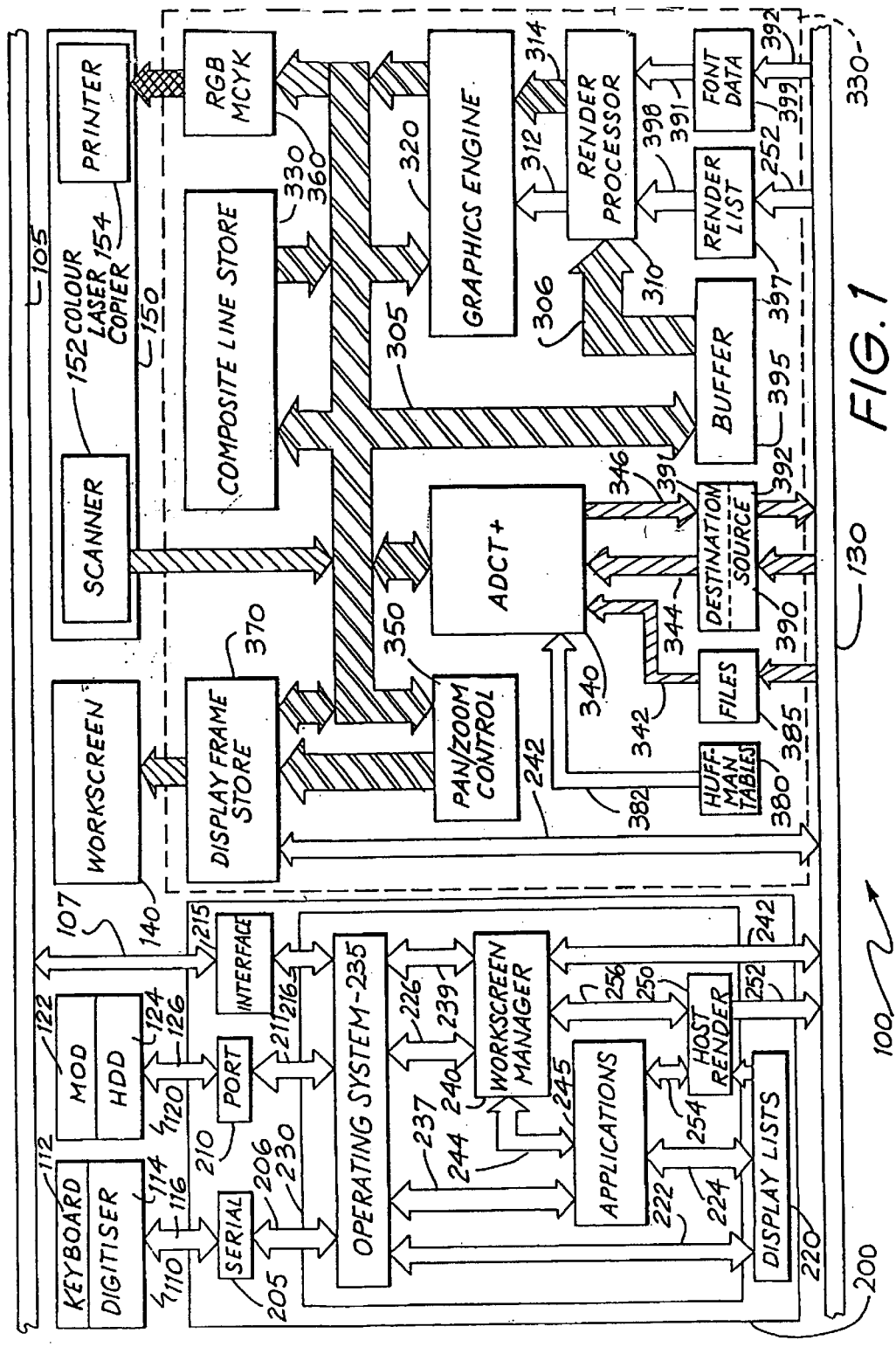
FIG. 1 is a schematic block diagram of a DTP system incorporating the preferred embodiment.

FIG. 1 shows a desktop publishing system (DTP) 100 which has been configured for high performance, high quality and high functionality at low cost. The illustration of FIG. 1 shows the major functional blocks within the system 100 and basic data flow between the various blocks. Control connections are not shown for the sake of clarity but would be understood by those by skilled in the art.

The DTP system 100 essentially comprises a computer system 200 and a graphics system 300 that are interconnected via a system bus 130. The computer system 200 can be any general purpose computer such as a Sun workstation for example.

The DTP system 100 also has a user interface 110 which includes a keyboard 112 which is used primarily for text entry and a digitizer 114 which acts as a pressure sensitive digitizing tablet for painting, drawing and command entry. The user interface 110 connects via serial connections 116 to a serial port 205, such as an RS232 arrangement, of the computer system 200. The DTP system 100 also includes a disk drive unit 120 which can include a magneto-optical disk drive (MOD) 122 and a standard hard disk drive (HDD) 124. The HDD 124 can be used for storage of standard colour DTP system data. The disk drive unit 120 interfaces to the computer system 200 via a connection 126 to a port 210 such as a Small Computer Systems Interface (SCSI).

The computer system 200 also has an interface device 215 which allows for a connection 110 to be made to a network bus 105 such as an Ethernet.

The computer system 200 includes a general purpose processor 230 such as a 68040 processor manufactured by Motorola. The processor 230 includes various software layers which perform various functions within the DTP system 100. An operating system 235 such as the Unix operating system acts as a software layer which provides system utilities such as multi-tasking kernel, file and I/O management and memory management.

A workscreen manager 240 is a software layer provided for communications and screen management functions. For example, the workscreen manager 240 can include an X-Windows system which is responsible for screen display management, including Windows, Icons, Cursors, and Buttons. In the case of "WYSIWYG" images, screen rendering is performed with the system 100 of a render pipeline which takes high level image representations in the form of display lists and converts them to colour pixel data. The workscreen manager 240 can also include the MOTIF system which is a style of user interface useful in DTP applications and in the operation of the DTP system 100.

An applications layer 245 is also provided which implements specific application necessary for desktop publishing. For example, the application layer 245 can include a colour Japanese language DTP system as well as graphics applications useful in the system 100. Other applications include English language document creation applications and filters such as a Postscript Level 2 to a Command Interface filter which converts one applications language into the specific command interface language used in the computer system 200. Preferably, the operating system 235 is multi-tasking such that more than one application can be implemented at any time. The applications layer 245 provides for the preparation of a page description language (PDL) of objects used to form a page image. The PDL is compiled to provide a high level representation of the page image as a display list.

A host render layer 250 forms part of the render pipeline. Whenever a new image is to be rendered (created), the host render layer 250 translates display list information from a display list memory 220 into a render list 397 which forms part of the graphics system 300. The host render layer 250 includes steps such as:

(a) calculation of the exact position, size, colour, blend and other characteristics of each text character;

(b) calculation of a spacial sub-division array to increase the speed of any subsequent rendering processes;

(c) calculation of spline outlines for all object based graphics images;

(d) culling objects and graphics which are not to be rendered, for example because they are on a different page of a multiple page document, or where only a portion of a page is to be rendered; and (e) routing of ADCT+ compressed files for expansion.

The display list memory 220 includes high level object based descriptions of coloured documents. The data contained in the display list memory 220 contains floating point object definitions, extending ASCII text definitions, and a ADCT+ compressed pixel images. The display list 220 is optimized for flexibility and ease of interactive modification and is a relatively compact description of any particular image. Pages of graphics and text have data sizes generally less than 10 Kbytes. A single display list can define a multiple page document.

The graphics system 300 as seen in FIG. 1, is structured about a compositing bus 305 which is generally 32 bits wide occupying 8 bits for each of red, green, blue and matte (transparencies) (RGBM) data.

The graphics system 300 includes a render processor 310 which is preferably a high performance 32 bit RISC processor such as the Intel i960 CA device with high speed DRAM memory interfaces and on-chip data and instruction caches. The render processor 310 also includes DMA channels for reading and writing ADCT+ compressed data to and from storage areas formed in DRAM. The main function of the render processor 310 is to convert render list data 398 into graphics engine commands 312. This process is known as BAND RENDER, and must be performed for each 8 line block of a page image and forms part of the render pipeline.

The render processor 310 outputs RGBM data 314 to a graphics engine 320 which composites runs, blends, bit maps, and other graphics commands into a composite line store 330. The graphics engine 320 is critical to the high performance of the DTP system 100 as it performs pixel and line level operations in hardware. Generally, the graphics engine 320 performs operations at a rate of 13.5 million pixels per second, even where complex transparency and colour blend operations are to be performed for every pixel. The graphics engine 320 is capable of performing many operations at a rate 100 times faster than is presently available in software implementations. A full description of a specific example of the graphics engine 320 can be found in Australian Patent Application No. 80226/91 claiming priority from Australian Patent Application Nos. PK1023 of Jul. 5, 1990 and PK3419 of Nov. 19, 1990 by the same applicant, the disclosure of which is incorporated by cross-reference.

Also connected to the compositing bus 305 is an ADCT+ processor 340 which converts ADCT+ compressed images into pixel data and vice versa in the manner described in Australian Patent Application No. PK1784 entitled "Compressed Image Stores for High Resolution Computer Graphics" of Aug. 16, 1990, the disclosure of which is hereby incorporated by cross-reference. The ADCT+ processor 340 performs adaptive discrete cosine transforms of pixel data to provide compressed images in a manner described in the CCITT/ISO JPEG standard. The ADCT+ processor includes variations to the JPEG standard which permit improvements in the quality of reconstructed text and allows for the insertion of marker codes at the end of each 8 line block of compressed data. Using the ADCT+ processor 340, a full A3 400 dot per inch page image which would normally occupy 98 MBytes of DRAM, can be stored in approximately 4 MBytes of memory in the destination/source location 390 which generally occupies about 12 MBytes of the DRAM 420.

Figure 2A:
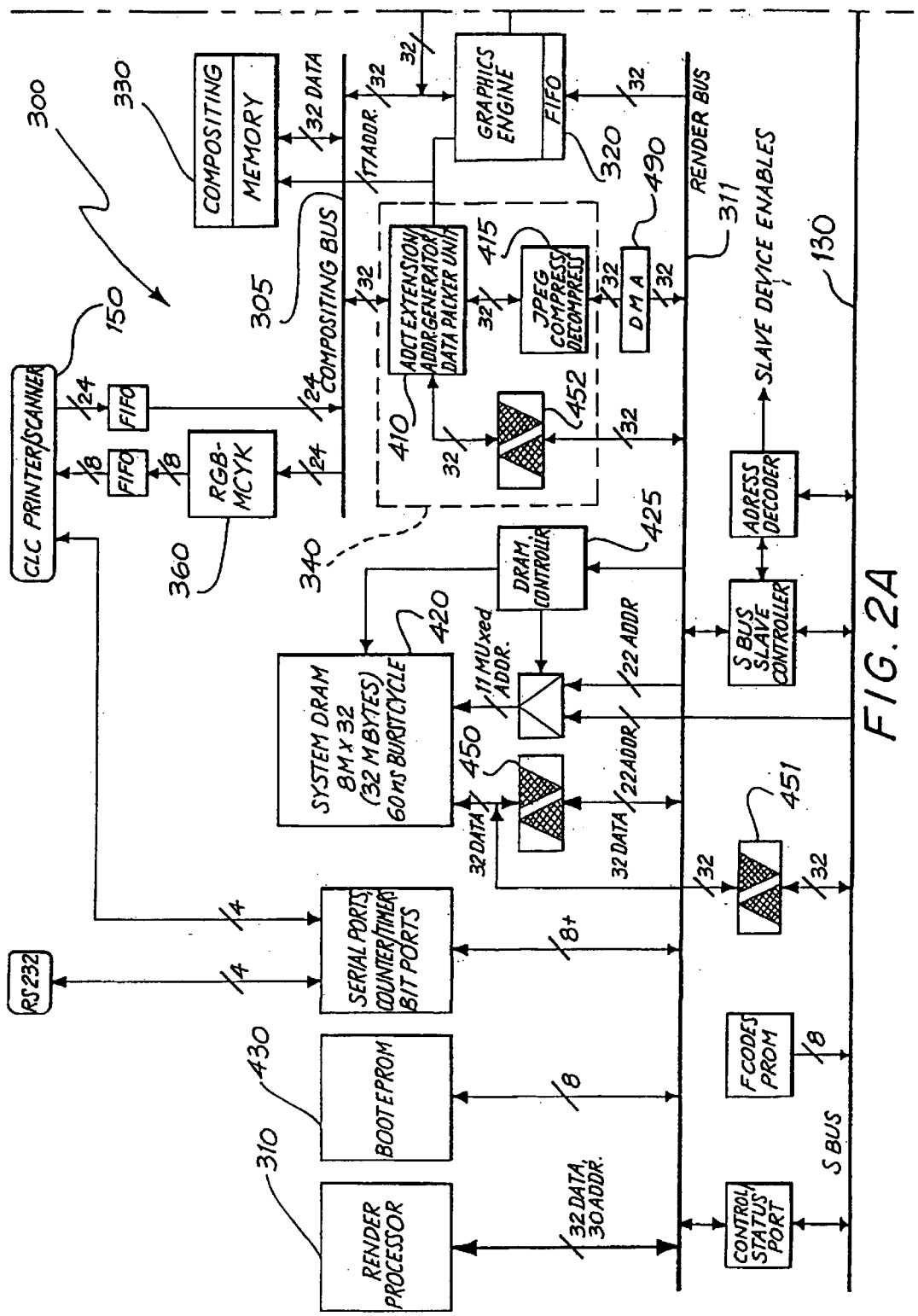
FIG. 2 is a schematic block diagram of a circuit of a graphics system included in the DTP system of FIG. 1.
Figure 2B:
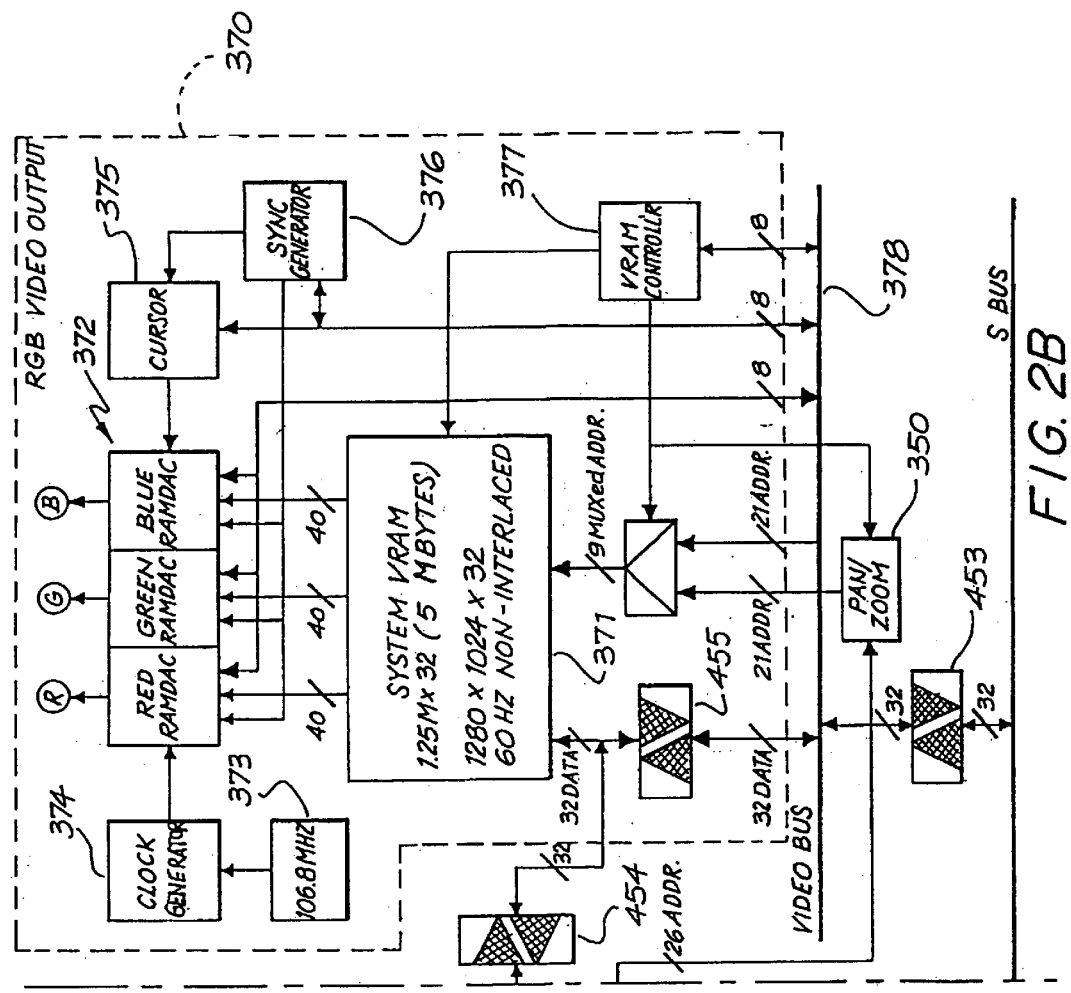

The graphics system 300 includes a number of designated memory locations which are formed in DRAM. Those memory locations provide storage for Huffman tables 380, compressed image files 385, compressed image data 390 having both destination 391 and source 392 partitions, a buffer 395, the render list 397 and for font data 399. With reference to FIG. 2, each of these designated memory locations is formed within 32 megabytes of DRAM 420.

The render list 397 is a low level object based description of an image to be shown on a workscreen 140 of the system 300. The workscreen 140 can be either a video display or a liquid crystal display. The render list 397 contains data indicative of individual spline definitions, individual character positions, ADCT+ compressed pixel images, and a spacial sub-division system for speed optimization. The render list 397 is optimized for speed and is generally large in comparison with the display list 220. Approximately 4 MBytes of memory is allocated for the render list 397. In very complex object based images, more than this amount may be required. In such cases the image must be rendered in several passes.

The font data cache 399 is used to store font data in both outline format and pixel format.

The file store 385 contains an image file in ADCT+ compressed form which is typically an image file to be expanded and composited with the existing source image. The file ADCT+ image may contain more than one compressed image file. It also forms part of the render pipeline.

The source page image store 392 is a section of the DRAM 420. It forms part of the compositing pipeline. For each compositing pass, data in the source page image store 392 is expanded, compressed and written into the destination page image store 391 occupying adjacent memory locations in the DRAM 420. As the image source is no longer required when a new image is created, the source page image store 392 is overwritten by the destination page image.

Similarly, the destination page image store 391 stores the ADCT+ compressed page image after compositing. The destination page image of one compositing pass will typically become the source page image for the next compositing pass. The destination page image store 391 is also part of the compositing pipeline.

The image buffer 395 is a section of the DRAM 420 used to temporary buffer an 8 line block of the page image so that it can be processed by the render processor 310. The types of processing typically performed include formatting into graphics engine commands, and software anti-aliased zoom operations.

The Huffman tables 380 are a section of the DRAM 420 used to store the set-up data for a JPEG compression/decompression device 415, seen in FIG. 2, which forms part of the ADCT+ processor 340. Such a device is the C-Cube CL550B image compression processor. Whenever the JPEG device 415 is changed from compression mode to expansion mode, or vice versa, various tables and registers need to be changed. The largest of these is the Huffman table, but quantization tables and general registers must also be changed. In many instances, the mode of the compression processor 415 is changed as many as 1,620 times during the composition of a single A3 page. For this reason, the Huffman tables 380 are provided as a separate block of hardware to assist in the rapid change of the processor mode. This hardware consists of a DMA channel and a logic block 490 seen in FIG. 2 which converts the DMA data stream into direct control signals for the JPEG chip 415.

A display frame store 370 connects to the composite bus 305 for the display of graphics images on the workscreen 140. The display frame store 370 is a frame store preferably comprising 1,280 pixels by 1,024 lines with 32 bits per pixel. There are 8 bits for each of red, green, blue and matte planes. The matte plane is not displayed but is used for compositing operations using the graphics engine 320. The display frame store 370 also includes a separate hardware cursor 375, seen in FIG. 2. The display frame store accordingly outputs RGB data to the workscreen 140.

A pan/zoom controller 350 connects to the compositing bus 305 as well as to the display frame store 370 and is used to display a portion of the full page in a window of the workscreen 140. The pan/zoom control unit 350 is capable of integer zoom ratios, such as 1:1, 2:1, 3:1, 4:1, etc. Zoom ratios required to view an entire A3 page on the workscreen is 6:1. Low zoom ratios are useful for close-up views of a portion of a page. The pan/zoom controller 350 is also capable of enlargement of the image for fine detailed work. Enlargements of up to 1:16 are available, resulting in a single page image pixel being written to a 16×16 pixel block of the workscreen 140.

Apart from displaying images on the workscreen 140, the DTP system 100, using a colour laser copier 150, allows for image data to be scanned into the system 100 using a scanner 152 of the copier 150 and printed using a printer 154. The colour laser copier 150 can for example be the Canon Colour Laser Copier CLC500 or CLC300, for example. The scanner 152 is capable of scanning an A3 page at 400 dots per inch resolution. The scanner output is in the form of 8 bits for each of red, green, and blue which are buffered simultaneously onto the compositing bus 305. The printer 154 is driven from the compositing bus 305 via a RGB to MCYK converter 360. The converter 360 converts red, green and blue data to magenta, cyan, yellow and black (MCYK) data which is used for the printing process of the printer 154.

The compositing line store 330 is a high speed static memory array which provides 16 lines of page image storage. The compositing line store 330 has four 8 bit planes for red, green, blue and matte. The compositing line store 330 is used in several ways. Firstly, the line store 330 is used as a compositing memory for the page image. In this case, the graphics engine 320 composites 8 lines of object or image data at a time, and the system 300 advances to the next 8 lines of the page image.

Secondly, it is used as a temporary storage buffer for the expanded data of a compressed image file.

Finally, the line store 330 is used as a re-ordering line buffer for the ADCT+ processor 340. When the DTP system 100 is printing a page, the page image must be expanded synchronously. The compositing line store 330 is used to re-order 8 lines of image data from the 8×8 pixel block into 8 lines. All 16 lines of the compositing line store 330 are required in this instance, as the ADCT+ processor 340 must be able to write pixel blocks at the same time as pixel lines are being sent to the printer 154. A similar situation exists for the scanner 152, except in reverse.

The DTP system 100 includes numerous data types that are transferred throughout. Already discussed, are the RGBM type transferred on the compositing bus 305 and RGB data transferred to the converter 360, from the scanner 152, and to workscreen 140.

Also transferred to the display frame store 370 is a synchronous 24 bit RGB pixel data from the workscreen manager 240 via data links 242 and the system bus 130. Such synchronous data is normally used only by the user interface 110 under the control of workscreen manager 240 (such as X-Windows), and is normally written to or read from the workscreen memory formed as VRAM 371 seen in FIG. 2.

Compressed image data is formed by the ADCT+ PROCESSOR 340, and via the files memory 385 and image memory 390, can be buffered onto the system bus 130. The system bus 130, together with the network bus 105 carry mixed data types and can distribute those data types to peripheral devices connected to the network 105.

Referring now to FIG. 2, a schematic block diagram of the graphics system 300 is shown. The system 300 includes four main busses, one of which is the system bus 130 already described and another of which is the compositing bus 305, also described. A render bus 311 interconnects circuit components associated with image generation and editing. Connected to the render bus 311 is the render processor 310, a boot EPROM 430 which contains low level controlling software, the graphics engine 320 and the ADCT+ processor 340 which includes the JPEG device 415 and the ADCT extension 410. The system DRAM 420 connects via two bus drivers 450 and 451 to the render bus 311 and the system bus 130, respectively. In this manner, data can be buffered into and out of each of the Huffman tables 380, compressed files 385, image storage 390, the buffer 395, the render list 397 and the front data store 399 onto either bus 311 or 130. A logic block 490 is provided for direct memory access (DMA) of the Huffman tables 380 stored in the DRAM 420 to the JPEG chip 415. A bus driver 452 is provided for direct memory access between the compositing memory 330 and the DRAM 420 via the data packer unit 410. Bus driver 452 also allows direct memory access of the JPEG extension data stored in the DRAM 420 to the JPEG chip 415, via the ADCT extension unit 410.

In a similar manner, the display frame store 370 connects to the compositing bus 305 via a bus driver 454. The bus driver 454 supplies a VRAM 371 which is central to the display frame store 370. The VRAM 371 outputs to RAMDAC's 372 for each of red, green and blue which provide video output to the workscreen 140. The display frame store 370 also includes an oscillator 373 which drives a clock generator 374 for the control of the RAMDAC 372. A separate cursor unit 375 is provided for control of the workscreen 140. A video bus 378 is provided which permits interconnection with the compositing bus 305 and the system bus 130. In this manner, workscreen data from a workscreen manager 240 can be buffered directly onto the video bus via a bus driver 453.

Having now described the general configuration of the desktop publishing system 100, specific operations and sequences can be described in greater detail.

Operation of the Workscreen

The DTP system 100 supports all of the capabilities of a page imaging system on the workscreen 140. To enable interactive graphics in a window environment, the workscreen 140 also has some other capabilities, including:

Direct access to any pixel: The G.P. processor 230 (68040) has direct memory mapped access to the workscreen VRAM 371.

Image generation in any order: Unlike the page image, which must be generated in left-to-right order, the workscreen image can be built in any order.

Horizontal graphics engine runs: The graphics engine 320 is only capable of vertical runs to the page image. Runs to the workscreen 140 can be either horizontal or vertical.

Hardware zoom: A hardware zoom facility is included for transferring pixels from the page image to the workscreen 140 at integer zoom ratios. This does not operate on the workscreen alone, so it cannot be used for real-time pan or zoom.

Windowing capability: The DTP system 100 hardware and software environment supports multiple windows, which may overlap.

Colour palette: The workscreen 140 includes a RAMDAC 372 color palette for each of the red, green and blue components. These palettes provide an arbitrary transfer function between the screen memory and the colour actually displayed on the workscreen 140. These palettes can be loaded with transfer functions designed to match the screen colour and gamma to that of the printer 154. A perfect match is not possible, as the printer 154 and screen 140 have different colour gamuts.

Interactive Graphics

There are several common features of the user interface of the DTP system 100 to known interactive graphics systems. However, some other features of the DTP system 100 differ, such as:

Object movement: As with most computer systems, the system 100 has no hardware support for interactive movement of pixel images on the screen. Movement of this kind is conventionally achieved by moving a simple representation of the object, such as a bounding box. This can be done by the G.P. processor 230 (68040) by drawing lines of inverted colour by direct pixel access. The image can be restored as the bounding box is moved by re-inverting the old bounding box position.

Handles: On-screen handles for objects, lines and splines can be drawn in inverted colour in a similar manner to the the bounding boxes.

Windows: Window borders and filled areas can be drawn rapidly using graphics engine commands 312. As the graphics engine 320 can draw both horizontal and vertical lines to the workscreen 140, rectangles can be drawn very rapidly.

WYSIWYG windows: Windows containing accurate WYSIWYG representations of the page image can be created by using a render pipeline to generate the screen image, or by generating a page image and "zooming" it to the workscreen. The render pipeline and other pipeline structures are more fully disclosed in Australian Patent Application No. . . . /91 and co-assigned patent application filed on the even date entitled "Pipeline Structures for High Resolution Computer Graphics" claiming the same priority as the present application.

Workscreen Operation While Compositing

The system 100 hardware supports continued operation while page compositing is in process. This operation can be in two ways:

Direct pixel access: Access to the workscreen VRAM 371 by the G.P. processor 230 is unaffected during compositing operations.

Graphics engine operations: Graphics engine 320 runs to the workscreen 140 cannot occur exactly simultaneously with compositing, but can be interleaved between each 8 line band of the page creation process. This means that the average latency to workscreen updates caused by simultaneous compositing operation is around 4 mS.

Workscreen Operation While Printing or Scanning

Interactive graphics and object graphics operations to the workscreen can continue while printing or scanning. However, it is not possible to expand or compress an ADCT+ image file while scanning or printing, as the ADCT+ compression processor is fully utilized at these times.

Printing, Scanning and Compositing

The DTP system 100 cannot perform any combination of printing, scanning, or compositing simultaneously. This is because printing and scanning are synchronous operations which both require the compression processor for their full duration.

<Rendering Software Technique>

The formation of pixel image data from object based data is known in the art as rendering. As such, rendering opaque images involves writing pixel image data into memory. However, when images are combining of pixel images, generally by controlling the proportion of two or more source images in a destination or composited image. Accordingly, rendering transparent images involves compositing newly rendered objects with existing pixel image data.

Using an ADCT+ compressed image store 390 requires that the image must be calculated in essentially the same order as the printer 154 requires the output data for printing. With the Canon colour laser printing process, printing occurs from the bottom left to the top right of an A3 page in landscape mode, as seen in FIG. 3.

This requirement for scan-line ordered image creation is different from the usual method of creating two dimensional object-based graphic images.

Most known systems, including most Postscript interpreters, use the "painters algorithm" which achieves the effect of obscuring underlying objects simply by "writing over" them in a pixel mapped (or bit-mapped for black and white) image store. To create the image shown in FIG. 4, the image is written object by object into the page image store, with each pixel of a new image replacing the pixel already present, in the manner shown in FIG. 5.

This method has the advantage of simplicity in that the image generation process need only consider each object in turn. This simplicity makes the method relatively easy to optimize for speed. Generally, a complete pixel mapped image store is required. For full colour A3 images at 400 dpi, this results in a memory requirement of approximately 96 MBytes per page.

It is possible to create the same image by creating rectangular strips, or bands. This is known as band rendering and is illustrated in FIG. 6. This is useful for systems which do not possess a full page memory, such as some laser printers and dot matrix printers.

Band rendering has the disadvantage of complexity in that all of the objects must be stored, usually in a display list, and the appropriate section of each object must be created for each band. During the process of creating each band, the painters algorithm can be used to overlay the visible objects in that band. This usually is substantially slower than when an entire page store is available, as each object must be created and clipped to each band.

The ADCT+ image compression system used in the DTP system 100 works on blocks of 8×8 pixels. An A4 image with 6,480 lines×4,632 pixels contains 810×579 pixel blocks. The rendering system in the DTP system 100 renders bands of 579 pixel blocks (8 vertical scan lines) in one pass. This rendering process must be repeated for 810 bands to render an entire A3 image.

The requirement to render 810 separate bands for each image places special concerns for speed and efficiency on the image generation process. For example, if an appropriate approach is not taken, image rendering could easily be 100 times slower than with conventional techniques. This problem is solved in the DTP system 100 by a combination of techniques, including the following:

- Conversion of the high level display list 220 into a low level render list 297 optimized for speed. While this process is complex and time consuming, it is only performed once for each image.
- Generation of a spatial subdivision array, so that the render processor 310 automatically "knows" which part of the render list 397 to process for each band.
- Inclusion of vertically scanned bitmapped font data 399 and a high speed format for outline font data.
- Inclusion of a very high speed rendering processor 310.
- Inclusion of special hardware—the graphics engine 320—to speed up colour, bitmap, transparency, and area fill operations by several orders of magnitude.
- Inclusion of high speed image compositing hardware.

The combination of these techniques makes the DTP system 100 operate at very high speed. A3 size images can be created in as little as 6 seconds, and will typically(take less than 20 seconds. This means that the DTP system 100 image generation speed is comparable to the Colour Copier print speed under most circumstances.

The order of image creation for the page image is limited by the nature of the image compression method and the image raster format required by the colour laser copier 150. For the Canon CLC500, image creation order must be from left to right of an A3 page in landscape format, or an A4 page in portrait format. Horizontal compositing runs to the 8 line buffer for the page image would be limited to eight pixels long, so only vertical runs are supported. There is no access to individual pixels of the page image without expanding and compressing the entire page.

However, the screen image has no such limitations. The image can be built in any order, and runs can be either vertical or horizontal. Individual pixels can also be addressed in random order. This makes the generation of interactive user interfaces substantially easier.

Processing Steps

Various processing steps that act on data in the DTP system 100 can now be described. As indicated above, the image is processed in bands generally 8 lines wide. Because of this, the composite line store 330 is preferably a multiple of 8 lines. Most preferably it is formed having a 24 line capacity including source, composite and destination locations. The band processing of data allows for individual processing steps to be pipelined which improves image generation speed.

BFI—Buffer File Image

This configuration provides for buffering of an expanded file image into the buffer 395 in DRAM, where it can be processed by the render processor 310. This step is performed where there is no matte associated with the file image. Where a matte is included, the step "Buffer file image and matte" is used.

Eight lines of RGB pixel data from the expanded image file are copied from the composite line store 330 into the DRAM buffer 395. This copying is performed by block DMA transfers initiated by the render processor 310.

This step will be performed once for every 8 line block of the image file. Buffering of the image data is required in most circumstances because the image data will typically be much larger than the command FIFO (seen in FIG. 2) of the Graphics Engine 320, and the composite line store 330 cannot be read at the same time as compositing.

As to the preconditions for the BFI process, eight lines of a file image must be expanded into the composite line store 330, and a DMA controller in the render processor 310 seen in FIG. 2 must be set up to transfer data from the compositing line store 330 to the DRAM buffer 395.

BIM—Buffer File Image and Matte

This configuration provides for the buffering of an expanded file image and file matte into the DRAM buffer 395, where it can be processed by the render processor. This data is in RGBM format, and can be transferred directly as RGBM pixels to the graphics engine 320.

Eight lines of RGBM pixel data from the expanded image file are copied from the composite line store 330, into the DRAM buffer 395. This copying is performed by block DMA transfers of the render processor 310.

As to preconditions, eight lines of a file image must be expanded into the composite line store 330, eight lines of a file matte must be expanded into the composite line store 330, and the DMA controller in the render processor 310 must be set up to transfer data from the compositing line store 330 to the DRAM buffer 395.

CBM—Compositing Using Both Mattes

This configuration provides for the compositing of RGB image data with the composite line buffer 330 using the combination of an image matte and object transparency or a file matte.

RGB and matte pixel data is read from the compositing line buffer 330, composited with data generated by the graphics engine 320, and written back to the compositing line buffer 330 at the same address.

The RGB data generated by the graphics engine 320 can be in the form of object based data expanded into Colour Runs or Colour Blends, or RGB pixel data derived from File images which are transferred to the graphics engine 320.

The compositing is controlled by the combination of matte data in the compositing line store 330 and transparency data generated by the graphics engine 320. This transparency data can be in the form of object based data expanded into Transparency Runs or Transparency Blends, Bitmap data, or Matte pixel data derived from File images which are transferred to the graphics engine 320.

Regarding preconditions, graphic engine commands 312 must be established in the graphics engine 320.

- 8 lines of the page image must exist in the compositing line store 330, and
- 8 lines of the page matte must exist in the compositing line store 330.

CCB—Clear Compositing Buffer

This configuration provides for the clearing of the compositing line buffer 330 prior to the generation of images.

The compositing line buffer 330 has the capability of being cleared as the composited image is compressed. Therefore, it is only necessary to explicitly clear the compositing line buffer 330 for the first 8 line block of the image.

Eight runs of opaque white, of length equal to 4,632 pixels, are written to the compositing line buffer 330 by the graphics engine 320. The only precondition is that the graphics engine 312 commands must be established in the graphics engine 320.

CDL—Create Display List

The creation of a Display list is usually the first step in the creation of an image. A Display list is composed of data describing the image, and may contain graphic objects, text, and ADCT+ compressed images. The DTP 100 rendering system accepts display lists in the form defined by the command interface software layer (SCI).

A display list 220 may be derived from several sources:

1) It may be created interactively using the application 245 or other applications.
2) It may be created automatically by an application package, such as a graphing application.
3) It may be converted from some other form of display list or page description language, such as Postscript.
4) It may be retrieved from disk 120 as a previously created file.
5) It may be received over the network 105 from a remote workstation which is using the DTP system 100 as a printing resource.

CFF—Compositing File Using File Matte

This configuration provides for the compositing of RGB image data with the composite line buffer 330.

This step is performed where there is no matte associated with the page image. Where a Page matte is included, the step "Compositing using page matte" is used.

RGB pixel data is read from the compositing line store 330, composited with data generated by the graphics engine 320, and written back to the compositing line store 330 at the same address. The RGB data generated by the graphics engine 320 is in the form of RGB pixel data derived from File images which are transferred to the graphics engine 20. The compositing is controlled by Matte pixel data derived from a File matte which are transferred to the graphics engine 320.

As to preconditions, graphic engine commands 312 must be established in the graphics engine 320, and 8 lines of the page image must exist in the compositing line store 330.

CFI—Compress File Image

This configuration provides for the process of compressing a File image after scanning. When an image is initially scanned, it will typically be an entire A3 image. This is used to trim a scanned image for saving as a File image.

Only the selected rectangular region of the original scanned image is compressed. This region must be aligned with the 8×8 pixel grid of the scanned image. Eight lines of the RGB pixel data in the Compositing line buffer 330 are compressed by the ADCT+ system 340 in compression mode. This data is written to the destination compressed page image 391 in DRAM 420. The data required by the ADCT+ system 340 is in 8×8 pixel blocks, but is stored in the compositing line store 330 in Raster format. Therefore, the address sequence used when reading from the line buffer re-orders the data.

Three preconditions must be met. Firstly, the ADCT+ processor 340 must be set up into compression mode, the DMA controller 425 must be set up to transfer data from the ADCT+ system 340 to the destination compressed page image 391 in DRAM 420, and the compositing line store 330,address generator must be set up with the appropriate start pixels and line length for the destination image size and position.

CFM—Compress File Matte

This configuration provides for the process of compressing a file matte after compositing. This step also clears the matte plane of compositing buffer 330 to transparent to prepare for object graphics in the next 8 line block.

Eight lines of the composited matte pixel data in the Compositing line buffer 330 are compressed by the ADCT+ system 340 in compression mode. This data is written to the destination compressed file matte 391 in DRAM 420. The data required by the ADCT+ system 340 is in 8×8 pixel blocks, but is stored in the compositing line buffer 330 in Raster format. Therefore, the address sequence used when reading from the line buffer re-orders the data.

For preconditions, the ADCT+ processor 340 must be set up into compression mode, the DMA controller in the render processor 310 must be set up to transfer data from the ADCT+ system 340 to the destination compressed file matte 391 in DRAM 420.

The compositing line store 330 address generator must be set up in the appropriate re-ordering mode.

CFO—Compositing File using Object Matte

This configuration provides for the compositing of RGB image data with the Composite line buffer 330.

RGB pixel data is read from the compositing line buffer 330, composited with data generated by the graphics engine 320, and written back to the compositing line buffer 330 at the same address.

The RGB data generated by the graphics engine 320 is in the form of RGB pixel data derived from File images which are transferred to the graphics engine 320.

The compositing is controlled by transparency data generated by the graphics engine 320, which is in the form of object based data expanded into Transparency Runs or Transparency Blends or Bitmap data.

Preconditions: Graphic engine commands 312 must be established in the graphics engine 320 and 8 lines of the page image must exist in the compositing line store 330.

CFP—Compositing File using Page Matte

This configuration provides for the compositing of RGB image data with the composite line buffer 330 using a matte associated with the page image.

RGB and matte pixel data is read from the compositing line store 30, composited with data generated by the graphics engine 320, and written back to the compositing line store 330 at the same address.

The RGB data generated by the graphics engine 320 is in the form of RGB pixel data derived from file images which are transferred to the graphics engine 320.

Regarding preconditions, graphic engine commands 312 must be established in the graphics engine 320, 8 lines of the page image must exist in the compositing line store 330 and 8 lines of the page matte must exist in the compositing line store 330.

CMO—Composite Matte Only

It is possible to generate complex object based mattes by using drawing tools with the colour component suppressed. In this way, a matte can be "painted" using multiple layers of transparency. When using such a matte to composite files, the matte can be generated in much the same manner as for object graphics, by suppressing the RGB colour components during compositing.

Matte pixel data is read from the compositing line store 330, composited with data generated by the graphics engine 320, and written back to the compositing line store 330 at the same address.

The matte (transparency) generated by the graphics engine 320 is in the form of object based data expanded into Transparency Runs or Transparency Blends or Bitmap data. Either the page matte of the file matte may be composited using this method.

Preconditions: Graphic engine commands 312 must be established in the graphics engine 321 and 8 lines of the page matte or file matte must exist in the compositing line store 330.

COI—Composite Object Based Image

This configuration provides for the compositing of object based graphics (and text) with the composite line buffer 330.

RGB pixel data is read from the compositing line buffer 330, composited with data generated by the graphics engine 320, and written back to the compositing line buffer 330 at the same address. The RGB data generated by the graphics engine 320 is in the form of object based data expanded into Colour runs or Colour blends.

The compositing is controlled by transparency data generated by the graphics engine 320, which is in the form of object based data expanded into Transparency Runs or Transparency Blends or Bitmap data.

Preconditions: Graphic engine commands 312 must be established in the graphics engine 320 and 8 lines of the page image must exist in the compositing line buffer 330, except where the compositing memory is completely filled with opaque runs (for example, when using the White Run command to generate a blank background).

CPI—Compress Page Image

This configuration provides for the process of compressing a Page image after compositing. This step also clears the compositing buffer 30 to white to prepare for object graphics in the next 8 line block.

Eight lines of the composited RGB pixel data in the Compositing line buffer 330 are compressed by the ADCT+ system 340 in compression mode. This data is written to the destination compressed page image 391 n DRAM 420. The data required by the ADCT+ system 340 is in 8×8 pixel blocks, but it is stored in the compositing line buffer 330 in Raster format. Therefore, the address sequence used when reading from the line buffer re-orders the data.

For preconditions the ADCT+ processor 340 must be set up into compression mode, the DMA controller in the render processor 310 must be et up to transfer data from the ADCT+ system 340 to the destination compressed page image 391 in DRAM 420, and the compositing line buffer address generator 410 must be set up in the appropriate re-ordering mode.

CPM—Compress Page Matte

This configuration provides for the process of compressing a page Matte after compositing. This step also clears the matte plane of compositing buffer 330 to transparent to prepare for object graphics in the next 8 line block.

Eight lines of the composited matte pixel data in the Compositing line buffer 330 are compressed by the ADCT+ system 340 in compression mode. This data is written to the destination compressed page matte 391 in DRAM 420. The data required by the ADCT+ system is in 8×8 pixel blocks, but is stored in the compositing line buffer 330 in Raster format. Therefore, the address sequence used when reading from the line buffer re-orders the data.

Preconditions: The ADCT+ processor 340 must be set up into compression mode, the DMA controller in the render processor 310 must be set up to transfer data from the ADCT+ system 340 to the destination compressed page matte 391 in DRAM 420 and the compositing line buffer 330 address generator 410 must be set up in the appropriate re-ordering mode.

CRL—Create Render List

This data path is used to convert a display list 220 in the form defined by the command interface (SCI) layer into a render list 397.

The conversion from a display list 220 to a render list 397 is performed by the Host Render program running, on the G.P. processor 230. The display list 220 is read from memory on the computer system 200, converted, and stored as a render list in the shared memory (DRAM 420). ADCT+ image files which form part of the display list 220 are transferred to the shared memory (420) without alteration. While these are part of the render list 397, they are shown separately as their data path diverges from that of object graphics after this stage.

Preconditions: A display list 220 in command interface layer format is required for conversion.

CTW—Composite to Workscreen

This configuration provides for the compositing of object based graphics (and text) with the workscreen 140. This configuration is used to provide high speed interactive WYSIWYG graphics.

RGB pixel data is read directly from the display frame store 370, composited with data generated by the graphics engine 320, and written back to the display frame store 370 at the same address. Note that memory access to the workscreen 140 is substantially slower than to the compositing line buffer 330, so the compositing pixel rate will be much lower. However, the workscreen 140 contains only 4.37% as many pixels as the page image, so the image creation rate should be acceptable.

Preconditions: Graphics engine commands 312 must be established in the graphics engine 320.

CWM—Composite Using Workscreen Matte

This configuration provides for compositing of object based graphics (and text) with the workscreen 140, using the workscreen matte plane. This configuration is used to provide high speed interactive WYSIWYG graphics.

RBG and matte pixel data is read directly from the display frame tore 370, composited with data generated by the graphics engine 320, and written back to the display frame store 370 at the same address. In most circumstances, the workscreen matte plane is not altered by this process. However, the DTP system 100 has the capability of simulating the cumulative interaction between paint and a textured background. When this capability is utilized, the matte plane is also altered during compositing. Note that memory access to the workscreen 140 is substantially slower than to the Compositing line buffer 330, so the compositing pixel rate will be much lower. However, the workscreen contains only 4.37% as many pixels as the page image, so the image creation rate should be acceptable.

Preconditions: Graphics engine commands 312 must be established in the graphics engine 330.

DXP—Draw X-Windows Pixels

This configuration provides for the drawing of graphics to the workscreen 140 by writing individual pixels via direct access to the workscreen VRAM 371. This method is relative slow, but allows pixels to be written in any order, and access to the workscreen memory 371 by this method is available at all times.

RGB pixel data is written directly to the workscreen memory 371, by the G.P. processor 320.

EFI—Expand File Image

This configuration provides for the process of expanding a compressed image file ready for compositing with the source image.

Eight lines of the ADCT+ compressed image file 385 are expanded into RGB pixel data by the ADCT+ system 340 in expansion mode. This data is written directly to the composite line buffer 330. The data from the ADCT+ system 340 is in 8×8 pixel blocks, but is stored in the composite line buffer 330 in Raster format. Therefore, the address sequence used when writing to the line buffer re-orders the data. This step will be performed once for every 8 line block of the image file.

The preconditions are that the ADCT+ processor 340 must be set up into expansion mode, the DMA controller in the render processor 310 must be set up to transfer data from the file image 385 in DRAM 420 to the ADCT+ expander 340, and the composite line buffer 330 address generator 410 must be set up in the appropriate re-ordering mode.

EFM—Expand File Matte

This configuration provides for the process of expanding a File matte before compositing. The File matte can be used to control compositing of Files with the page image.

Eight lines of the ADCT+ compressed file matte are expanded from the source 392 into Matte pixel data by the ADCT+ system 340 in expansion mode. This data is written directly to the matte plane of the composite line buffer 330. The RGB planes of the composite line buffer are not affected. The data from the ADCT+ system 340 is in 8×8 pixel blocks, but is stored in the composite line buffer 330 in Raster format. Therefore, the address sequence used when writing to the line buffer re-orders the data.

As to preconditions, the ADCT+ processor 340 must be set up into expansion mode, the DMA controller in the render processor 310 must be set up to transfer data from the file matte 392 in DRAM 420 to the ADCT+ expander 340, and the compositing line buffer 340 address generator 410 must be set up in the appropriate re-ordering mode.

EPI—Expand Page Image

This configuration provides for the process of expanding a Page image ready for compositing. This is generally the first step in the process of compositing new information with an existing page image.

Eight lines of the ADCT+ compressed Page image are expanded from the source 392 into RGB pixel data by the ADCT+ system 340 in expansion mode. This data is written directly to the composite line buffer 330. The data from the ADCT+ system 340 is in 8×8 pixel blocks, but is stored in the compositing memory in Raster format. Therefore, the address sequence used when writing to the line buffer re-orders the data.

The preconditions are that the ADCT+ processor 340 must be set up into expansion mode, and the DMA controller in the render processor 310 must be set up to transfer data from the source image 392 in DRAM 420 to the ADCT+ expander, and the compositing line buffer 330 address generator 10 must be set up in the appropriate re-ordering mode.

EPM—Expand Page Matte

This configuration provides for the process of expanding a Page matte before compositing. The page matte can be used to control compositing of files and object graphics with the page image.

Eight lines of the ADCT+ compressed page matte are expanded from the source 293 into matte pixel data by the ADCT+ system 340 in expansion mode. This data is written directly to the Matte plane of the composite line buffer 330. The RGB planes of the composite line buffer 330 are not affected. The data from the ADCT+ system 340 is in 8×8 pixel blocks, but is stored in he compositing line buffer 330 in Raster format.

Therefore, the address sequence used when writing to the line buffer re-orders the data.

Preconditions are that the ADCT+ processor 340 must be set up into expansion mode, the DMA controller in the render processor 310 must be set up to transfer data from the page matte 392 in DRAM 420 to the ADCT+ expander, and the compositing line buffer 330 address generator 410 must be set up in the appropriate re-ordering mode.

FAJ—Filter ADCT+ File to JPEG Format

When transferring image files from the DTP system 100 to systems which use the JPEG standard, the image format must be converted from ADCT+ to JPEG formats. Conversion from a ADCT+ file to an JPEG file requires the following processes:

1) The text detect array must be discarded. This will mean that the benefit of text detection will not be available, but there is no way for non ADCT+ systems to reproduce this benefit.

2) There is no need to remove the marker codes, as the presence of marker codes is a special mode of the baseline JPEG standard.

The ADCT+ format file is passed from the display list 220 through a "filter" program in the applications layer 245 which converts the file to JPEG format which is then written to the Hard Disk (HDD) 124 or Magneto-Optical Disk (MOD) 122 under the control of the operating system 235.

FFT—Format File Image

This configuration provides for the formatting of an expanded and buffered file image 395 from RGB pixels into graphics engine commands 312. This step is performed where there is no matte associated with the file image. Where a matte is included, the step "Format file image and matte" is used.

A graphics engine command 312 header is written to the graphics engine 320, specifying the number of pixels to be composited, the start pixel address, and the compositing mode. Where the graphics engine 312 command includes RGB pixel data, the run of RGB pixel data from the buffered image file is copied by the DRAM buffer 395 into the graphics engine 320. This copying is performed by render processor 310 performing block DMA transfers. This run may be longer than a graphics engine 320 FIFO 321 length (seen in FIG. 2), in which case a FIFO 321 full signal temporarily stalls the DMA transfer. This step is performed once for every compositing run. There are typically eight compositing runs for each 8 line block of an image file.

For preconditions, the RGB image data must be in the DRAM buffer 95, and the DMA controller in the render processor 310 must be set up to transfer data from the DRAM buffer 395 to the Graphics engine FIFO 321.

FIM—Format File Image and Matte

This configuration provides for the formatting of an expanded and buffered file image and file matte from RGBM pixels into graphics engine commands 312.

A graphics engine command 312 header is written to the graphics engine 320, specifying the number of pixels to be composited, the start pixel address, and the compositing mode. The relevant graphics engine commands 312 include RGBM pixel data from the buffered file image pixel data. This data is copied from the DRAM buffer 395 into the graphics engine 320 by the render processor 310 performing block DMA transfers. The data run may be longer than the graphics engine FIFO 321 length, in which case the FIFO full signal temporarily stalls the DMA transfer. This step is performed once for every compositing run. There are typically eight compositing runs for each 8 line block of an image file.

The preconditions are that the RGBM image data must be in the DRAM buffer 395, and the DMA controller 425 must be set up to transfer data from the DRAM buffer 395 to the graphics engine FIFO 321.

FJA—Filter JPEG File to ADCT+ Format

When transferring image files from systems which use the JPEG standard to the DTP system 100, the image format must be converted from JPEG to ADCT+ formats. Conversion from a JPEG file to an ADCT+ file requires the following processes:

1) A text detect array must be cleared, to indicate that each cell is to be treated as if it were an image cell and not a text cell. This maintains full JPEG image quality, although it does not take advantage of the ADCT+ text improvements.

2) Marker codes are inserted into the JPEG data stream, at the end of each 8 line block. This requires that the JPEG data steam be interpreted to establish where the blocks are, and reconstructed with marker codes installed. The DCPM encoded DC values within each block must be adapted, as the presence of the marker code will reset the DCPM register at the beginning of the 8 line block.

The JPEG format file is read from the Hard Disk (HDD) 124 or Magneto-Optical Disk (MOD) 122 under the control of the operating system 235 and passed through a "filter" program in the applications layer 245 which converts the file to ADCT+ format for storage in the display lists 220.

FWI—Fast Write of File Image

This configuration provides for the fast expansion and writing of a file image directly to the compositing line store 330.

This operates substantially faster than the more flexible compositing of a file, as the file data does not need to be buffered in DRAM 420, formatted into graphics engine commands 312, or composited. However, this can only be done where there is no matte or object based transparency associated with the file (therefore the image will be rectangular), and where the file can be aligned to the 8×8 pixel blocks used by the ADCT+ compression. This situation is common in most DTP applications.

Eight lines of the ADCT+ compressed image file 385 are expanded into RGB pixel data by the ADCT+ system 340 in expansion mode. This data is written directly to the compositing line buffer 330. This will overwrite the existing contents of the compositing line buffer 330 in the rectangular region specified.

The preconditions are that the ADCT+ processor 340 must be set up into expansion mode, the DMA controller in the render processor 310 must be set up to transfer data from the file image 385 in DRAM 420 to the ADCT+ expander 340, and the compositing line buffer 330 address generator must be set up in the appropriate re-ordering mode.

LHC—Load Huffman Table for Compress

This data path is used to set up the JPEG Chip 415 into compress mode. This must be done whenever a compression is to be performed when the chip is currently in expand mode.

The compress Huffman tables 380 and the other setup data for the JPEG chip 415 are transferred from DRAM 420 to the JPEG chip 415 by a DMA controller on the render processor 310. This data is in a special format which includes control data, and is written to a hardware location containing circuitry which interprets this data as control signals for the JPEG chip 415. This is so that the entire set-up of the various registers and arrays in the chip 415 can be achieved very rapidly.

The JPEG chip 415 must be changed from expand mode to compress mode (and back again) 810 times to composite a full A3 sized image.

Set-up data for the JPEG chip 415 is loaded into DRAM at boot time.

LHE—Load Huffman Table for Expand

This data path is used to set up the JPEG chip 415 into expand mode. This must be done whenever an expansion is to be performed when the chip 415 is currently in compress mode.

The expand Huffman tables 380 and other setup data for the JPEG chip 415 are transferred from DRAM 420 to the chip 415 a DMA controller on the render processor 410. This data is in a special format which includes control data, and is written to a hardware location containing circuitry which interprets this data as control signals for the JPEG chip 415. This is so that the entire set-up of the various registers and arrays in the chip 415 can be achieved very rapidly.

The chip 415 must be changed from compress mode to expand mode (and back again) 810 times to composite a full A3 sized image.

Set-up data for the JPEG chip 415 is loaded into DRAM at boot time.

PRN—Print

This configuration shows the process of printing an image. The compressed page image is expanded into RGB pixel data in real time, converted to MCYK data, and printed one colour component at a time.

The ADCT+ compressed page image 392 is expanded into RGB pixel data in real time by the ADCT+ system 340 in expansion mode. This data is written directly to the compositing line store 330, which is used as a re-ordering line store to convert the 8×8 pixel cells generated by the ADCT processor into raster data. The data is then converted in the converter 360 from RGB into Magenta, Cyan, Yellow, and Black, and printed. The colour laser printer 154 requires synchronous data which cannot be stopped in mid process. Therefore, the print operation must be treated as a single indivisible operation, and must operate in real time. The expansion, conversion and printing process is performed four times for each copy to be printed: once for each of the Magenta, Cyan, Yellow, and Black colour printing passes. Data output timing is controlled by line and page sync signals from the printer 154.

The preconditions are that the ADCT+ processor 340 must be set up into expansion mode, the DMA controller in the render processor 310 must be set up to transfer data from the DRAM 420 to the ADCT+ expander 340 and an RS232C print command is given to the printer 154.

OSZ—Quick Software Zoom

This configuration provides a zoom function performed by software in the render processor 310. This duplicates the function of the hardware pan-zoom engine 350 when displaying an image to the workscreen 140. The zoom is not anti-aliased.

This process is necessary where the file image is to be composited the workscreen 140 at other than unity zoom ratio. The hardware zoom can only be used where the image is to be simply written to the workscreen instead of composited.

The graphics engine 320 reads 8 lines of the RGB and matte pixel data from the buffer image 395 and creates a zoomed version of this for the workscreen by discarding a portion of the pixels. This zoomed version is written back to the image buffer 395. This version can then be transferred to the graphics engine 320 using DMA transfers.

The only precondition is that the RGBM image data must be in the buffer 395 of the DRAM 420.

RAD—Read ADCT+ File From Disk

Display lists 220 may include ADCT+ image files. The display list 20 must directly contain the ADCT+ filename, size, x/y size, matte configuration, and other characteristics, but need not contain the actual ADCT+ data, which can be as large as 4 MBytes. As the host render process 250 does not directly alter or use the ADCT+ data, this can be transferred directly to the memory (DRAM 420) from disk 120 as and when required. This avoids the double transfers necessary if the data is saved in a display list 220 on the computer system 200, and can therefore improve performance and reduce memory requirements. This is particularly significant for multiple page documents with many file images, where object data and text tends to be very compact. On demand direct loading of ADCT+ data means that very long colour documents can be edited and printed without running out of memory.

The ADCT+ file is read from the Hard Disk (HDD) 124 or Magneto-Optical Disk (MOD) 120 under the control of the operating system 235 and written directly to the DRAM 420 by SCSI DMA transfers from the port 210. The only precondition is that sufficient space must be available in the DRAM 420. This requires communications between the memory management running on the render processor 310 and the operating system 235.

RAF—Re-Size ADCT+ File

This configuration provides for the re-sizing of an ADCT+ image, performed by software on the render processor 310. This resizing is performed when the image required on the page is a different size than the image stored in the file.

To maintain image quality, aliasing noise is virtually eliminated by performing a bi-linear sample rate conversion. This process is processor intensive, typically involving a minimum of two multiplications and several additions per colour component per pixel. These must be performed in software.

The render processor 310 reads 8 lines of the RGB and matte pixel data from the buffer image 395 and creates a resized version of this for the workscreen 140 using bi-linear sample rate conversion. This resized version is written back to the image buffer 395. The resized image can then be transferred to the graphics engine 320 using DMA transfers. The only precondition is that the RGBM image data must be in the RAM buffer.

RBM—Render a Band of Object Matte

This data path is used to convert the object descriptions in a render list 397 into graphics engine "Transparency" commands 312.

The conversion from a render list 397 to Graphics engine commands is performed by a program running on the render processor 310 called BAND RENDER which performs band rendering in the manner already described. The render list 397 is read from shared memory 420 converted, and stored as commands in the Graphics engine command FIFO 321.

One "band" of 8 lines wide is rendered at a time. 810 bands must be rendered for a full A3 sized image, and 405 bands are required for an A4 image.

The only precondition is that a render list containing the object matte must be established.

RBO—Render a Band of Objects

This data path is used to convert the object descriptions in a render list 397 into graphics engine commands 312.

The conversion from a render list 397 to graphics engine commands 312 is performed by a program running on the render processor 310 called BAND RENDER. The render list 397 is read from shared memory 420, converted, and stored as commands in the Graphics engine command FIFO 321.

One "band" of 8 lines wide is rendered at a time. 810 bands must be rendered for a full A3 sized image, and 405 bands are required for an A4 image.

The preconditions for this process are that a render list 397 in appropriate format is required for rendering, all font descriptions required by text in the render list 397 must be available, either in the font cache 399, or by requesting the computer system 200, and the graphics engine command FIFO 321 must not be full. Block synchronisation with the FIFO 321 is required.

RDD—Read Display List from Disk

Display lists 320 are read from disk 120 as a named file by an application, and as spooled information for printing. A display list is composed of data describing the image, and may contain graphic objects, text, and ADCT+ compressed images.

The display list 220 is read from the Hard Disk (HDD) 124 or Magneto-Optical Disk (MOD) 122 under the control of the operating system 235 and written to DRAM (not illustrated) in the computer system 200.

RDE—Receive Display List from Ethernet

Normally Display lists are received from the Network 105 (Ethernet) as a remote printing job from another workstation on the network 105. This differs from reading a Display List from disk in that the task will normally be initiated remotely, and can coincide with display list manipulation occurring locally under the control of the application. This function is facilitated by allowing multiple Display lists to exist at the same time.

The Display list is received from Ethernet 105 under the control of the operating system 235 and written to DRAM (not illustrated) on the computer system 200.

RMF—Render Matte With File Image

This configuration shows formatting of an expanded and buffered File Image from RGB pixels into graphics engine commands 312, at the same time as rendering an object based matte.

The conversion from a render list 397 to graphics engine commands 312 is performed by a program running on the render processor 310 called BAND RENDER.

A graphics engine command 312 of a type containing a Transparency Run or Transparency Blend followed by pixel data is written to the graphics engine 320. This is followed by the RGB pixel data from the buffered file image 395. This data is copied from the DRAM buffer 320 into the graphics engine 320 by the render processor 310 performing block DMA transfers.

The preconditions are that a Render list 397 containing the object matte must be established, the RGB image data must be in the DRAM buffer 395 and the DMA controller in the render processor 310 must be set up to transfer data from the DRAM buffer 420 to the graphics engine FIFO 312.

SCN—Scan

This configuration shows scanning an image and compressing the file in ADCT+ format. Using the scanner 152, only a complete A3 page can be scanned using this method. A Trim Scan operation can be used to create smaller files (see the applications section following). The scanned image is not shown on the workscreen 140. This can be achieved using the Scan to workscreen operation.

The scanner 152 data is written directly to the compositing line store 330. In this case, the compositing memory is used as a re-ordering line store to convert the raster data from the scanner 152 to the 8×8 pixel cells required by the ADCT+ processor 340. While the scanner data is written to one half of the re-ordering line store, it is read from the other half by the ADCT+ processor 340 and compressed to create the destination image 391. The data from the scanner 152 is synchronous, so the scan operation must be treated as a single indivisible operation, and must operate in real time.

The preconditions are that the ADCT+ processor 340 must be set up into compression mode, the DMA controller in the render processor 310 must be set up to transfer data from the ADCT+ compressor 340 to the DRAM 420, and an RS232C scan command is given to the scanner 152.

STW—Scan to Workscreen

This configuration provides for the scanning of an image and displaying a reduced version on the workscreen 140. This is used to accurately position the image on the scanner 152 and ensure that the zoom ratios, image angle, and other factors are correct before performing the final scan of the image.

The Scanner data is written to the compositing line store 330. In this case, the compositing line store 330 is used as an image buffer to allow a synchronous operation of the scanning and transfer to the workscreen 140. While the scanner data is written to one half of the image buffer, it is read from the other half by the graphics engine 320, which provides the pan-zoom 350 controller with start addresses and zoom ratios. A selection of the pixels from the scanned image are written to the workscreen 140 under the control of the pan-zoom controller 350. The scan operation must be treated as a single operation, and must operate in real time.

Two preconditions exist and are that graphics engine commands 312 are established to set up the pan-zoom controller 350 with the start address of every run. These commands should take into account the zoom ratio of the image, the size and position of the image window, and the presence of any windows which may overlay the image window, and an RS232C scan command is given to the scanner 152.

WAD—Write ADCT+ Image to Disk

ADCT+ images are usually saved to disk as a "File Image" after scanning and trimming.

Complete composited pages can also be saved to disk as ADCT+ images rather than as object based Display lists, but this is unlikely to be a normal operating procedure. The advantage of doing this is to avoid re-compositing a complex image if the same image is to be printed later. ADCT+ images may be stored in the DRAM 420 and directly transferred to disk 120. This avoids the double transfers necessary if the data is saved in a Display list on the computer system 200, and can therefore improve performance and reduce memory requirements.

The ADCT+ file is read from the DRAM 420 under the control of the operating system 235 and written directly to the Hard Disk (HDD) 124 or Magneto-Optical Disk (MOD) 122 by SCSI DMA transfers instituted by the port 210.

WDD—Write Display List to Disk

Display lists are saved to disk 120 in two major situations:
1) When saving work created by an Application 245, and
2) When spooling display lists for printing.

This occurs when a display list is received from remote workstations via the network 105, and there is insufficient memory to store the display list in RAM.

A Display list is composed of data describing the image, and may contain graphic objects, text, and ADCT+ compressed images.

The display list 220 resides in DRAM (not illustrated) on the computer system 200. It is written to the Hard Disk (HDD) 124 or Magneto-Optical Disk (MOD) 122 under the control of the operating system 235.

XRO—X-windows Renders Objects

In order to achieve high performance when creating screen displays for X-Windows operating as the workscreen manager 240, the graphics engine 320 can be used. When drawing to the workscreen 140, the graphics engine 320 can draw either horizontal or vertical (but not diagonal) runs. Therefore filled shapes and aligned lines can be drawn very rapidly, but diagonal lines are slow. There are several ways that X-Windows can draw to the screen, including:
1) Direct drawing of pixels to the VRAM.
2) Creation of a Display list 220, which is converted to a Render list 397 by Host Render 250, and to graphics engine commands 312 by Band Render,
3) Direct creation of a Render list 397, which is converted to graphics engine commands 312 by Band Render,
4) Direct creation of graphics engine commands 312, which are loaded to the graphics engine 320 by the render processor 310, and
5) Direct creation and loading of graphics engine commands 312, (requiring synchronisation locks with the i960 processor).

X-Windows, running on the G.P. processor 230, directly creates graphics engine commands 310 for the Workscreen 140, and passes them to the render processor 310, which places them in the graphics engine command FIFO 321.

ZTW—Zoom to Workscreen

This configuration provides the process of expanding a Page image to display a portion of it on the Workscreen 140.

The ADCT+ compressed page image 392 is expanded into RGB pixel data by the ADCT+ system 340 in expansion mode. This data is written directly to the compositing line store 330. The compositing line store 330 is used as a re-ordering line store to convert the 8×8 pixel cells generated by the ADCT+ processor 340 into raster data required by the Pan-Zoom engine 350. The graphics engine 320 reads lines of pixels from the compositing line store 330 and writes them to the pan-zoom engine 350.

The preconditions are that the ADCT+ processor 340 must be set up into expansion mode, the DMA controller in the render processor 310 must be set up to transfer data from the Source image 392 in DRAM 420 to the ADCT+ expander 340, the compositing line store 330 address generator 410 must be set up in the appropriate re-ordering mode, and graphics engine commands 312 are established to set up the pan-zoom controller 350 with the start address of every run. These commands should take into account the zoom ratio of the image, the size and position of the image window, and the presence of any windows which may overlay the image window.

<Application Examples>

Following are examples of how the DTP system 100 hardware can be used to achieve various functions.

These examples show functional possibilities only, and do not imply that the function described will be supported by the Seraph application software, or that the Seraph application will use the particular example shown here in cases where there is more than one way of achieving a function.

The following is not a definitive set of possible functions, but is intended to show enough combinations to convey the capabilities and limitations of the Seraph hardware.

The three letter Mnemonics used in the tables referred to in this section are defined in the preceding section on "processing steps".

The tables are arranged to show those processing steps that are performed simultaneously and sequentially. The application sequence starts at the top of each table and proceeds down the page (with line). Horizontally aligned processing steps are performed simultaneously.

EXAMPLE 1

Composite Layers of Objects With Image

Table 1 shows the steps necessary when compositing graphic objects or text over an existing ADCT+ image. This process is normally be done as part of an interactive image composition sequence. The number of layers of graphic objects that can be composited in one pass is limited only be available render list memory. Typically, many thousands of objects are generally composited in one pass. In subsequent compositing diagram, all contiguous layers of object graphics are shown as a single layer.

Table 1 Notes

1) The rendering of object based images can overlap all of the previous stages until the graphics engine commands 312 for those objects are required for compositing.

2) Loading of the JPEG Chip 415 Huffman tables and other data for compression can begin as soon as the page image has been expanded.

EXAMPLE 2

Composite File Using Image Matte

Table 2 shows the steps necessary when compositing an ADCT+ compressed file image with the existing ADCT+ page image. This configuration uses an ADCT+ compressed Matte associated with the file to control the compositing of the file image with the page image. This process would normally be done as part of an interactive image composition sequence. A file matte will usually be used to "cut out" the region of interest in a photograph.

Table 2 Notes

1) Loading of the JPEG chip 415 Huffman tables and other data for compression can begin as soon as the page image has been expanded, however, there may be DMA memory contention which will reduce the efficiency of buffering and formatting. For this reason loading of the Huffman tables is shown to occur during compositing.

EXAMPLE 3

Composite File Using Page Matte

Table 3 shows the steps necessary when compositing an ADCT+ compressed file image with the existing ADCT+ page image. This configuration uses an ADCT+ compressed Matte associated with the page image to control the compositing of the file image with the page image. This process is normally done as part of an interactive image composition sequence. A page matte is usually used to "protect" some region of the page image from being composited over.

Table 3 Notes

1) Loading of the JPEG chip 415 Huffman tables and other data for compression can begin as soon as the page image has been expanded, however, there may be DMA memory contention which will reduce the efficiency of buffering and formatting. For this reason loading of the tables is shown to occur during compositing.

EXAMPLE 4

Composite File Using Both Mattes

Table 4 shows the steps necessary when compositing an ADCT+ compressed file image with the existing ADCT+ page image. This configuration uses the simultaneous combination of two mattes to control the compositing of the file image with the page image. These mattes are a matte associated with the page image (the Page Matte) and the matte associated with the file image (the File Matte). This can be used for various special effects, such as to "insert" a file image behind some portions of the page image and in front of other portions, to control the density of an image based on a page "texture" as well as to allow the placement of images with transparent regions into a "window" (which may be irregular and of variable density) on the page.

Table 4 Notes

1) Compositing with both mattes is a complex operation where the two mattes may be combined in various ways. The functional specification of the graphics engine 320 described in Australian Patent Application Nos. PK1023 and PK3419 can be of assistance.

EXAMPLE 5

Print Object Graphics and Text Only

Table 5 shows the steps necessary when compositing and printing object based images or text, on a blank page. The number of layers of graphic objects that can be composited in one pass is limited to only be available render list memory. Typically, many thousands of objects could be composited in one pass. In subsequent printing diagrams, all contiguous layers of object graphics are shown as a single layer. The background is white. If other colour backgrounds are required, they must be created by overlaying the background with full page graphic objects.

Table 5 Notes

1) The rendering of object based images can overlap all of the previous stages until the graphics engine commands 312 for those objects are required for compositing.

2) Loading of the JPEG chip 415 Huffman tables for compression can be done once, before compositing begins. This is because there are no files to be expanded.

3) The compression operation clears the composite line buffer 330 to white for the next 8 line block.

4) The JPEG chip 415 needs to be loaded with the expansion tables before printing.

EXAMPLE 6

Print the Existing Page Image

Table 6 shows the printing of an existing page image, which will typically be in the Source ADCT+ image memory 392.

EXAMPLE 7

Print Image, Matte, and Graphics

Table 7 shows the steps necessary when compositing and printing an ADCT+ Image file with associated ADCT+ Matte, as well as object based images or text, on a blank page. The background is white. If other colour backgrounds are required, they must be created by overlaying the background with full page graphic objects.

Table 7 Notes

1) The rendering of object based images can overlap all of the previous stages until the graphics engine commands 312 for those objects are required for compositing.

2) Loading of the Huffman tables and other data for compression (expansion) can begin as soon as the last file has been expanded (compressed). Here it is shown to occur after the file data has been formatted and loaded into the graphics engine, to avoid consuming DRAM bandwidth, which may slow down the buffering process.

3) The formatting and compositing of file RGB or RGBM pixel data will usually overlap, as this data will often be larger than the graphics engine command FIFO 321.

EXAMPLE 8

Print 2 Images With Object Mattes, and Text

Table 8 shows the steps necessary when compositing and printing two ADCT+ Image files, each with object based Mattes, on a blank page. The top layer of the image contains Object based text or graphics. This compositing sequence is only required in regions where the two ADCT+ images share vertical compositing blocks. Where there is no vertical overlap, the compositing may proceed as if there were only one image. The background is white. If other colour backgrounds are required, they must be created by overlaying the background with full page graphic objects.

Table 8 Notes

1) Rendering is of the matte for File 1. This must be completed before File 1 is composited.

2) Rendering is of the matte for File 2. This must be completed before File 2 is composited.

3) Rendering of the top layer of objects and text can begin at any time, but graphics engine commands 312 for the objects cannot be put into the graphics engine 320 until all of the commands for the file compositing are entered (unless there is guaranteed to be no overlap).

EXAMPLE 9

Print 2 Images With File Mattes, and Text

Table 9 shows the steps necessary when compositing and printing two ADCT+ Image files, each with associated ADCT+ Mattes, as well as object based text, on a blank page. This compositing sequence is only required in regions where the two ADCT+ images share vertical compositing blocks. Where there is no vertical overlap, the compositing may proceed as if there were only one image. The background is white. If other colour backgrounds are required, they must be created by overlaying the background with full page graphic objects.

Table 9 Notes

1) The rendering of object based text can overlap all of the previous stages until the graphics engine commands 312 for the text are required for compositing.

EXAMPLE 10

Print 3 Opaque Rectangular Images and Text

Table 10 shows fast creation of a page with three images and text. This fast compositing method can only be used where there is no matte associated with the image, where there is no page matte, and where the image is aligned to the 8×8 ADCT+ pixel grid. Alignment to the grid created a maximum positioning error of +4 pixels, or +0.25 mm. In many circumstances, this position constraint is irrelevant. Alignment to the grid also preserves image quality, as the image will not alter when expanded and re-compressed if the image is grid-aligned. When there is no matte associated with the image, the image will be fully opaque, and rectangular.

Table 10 Notes

1) The rendering of object based text can overlap all of the previous stages until the graphics engine commands 312 for the text are required for compositing.

2) The fast compositing of file images using only the single overwrite step can only be done if the image is opaque, rectangular, and grid aligned.

3) Loading of the Huffman tables and other data for compression can begin as soon as the last file has been expanded.

EXAMPLE 11

Zoom to Workscreen

Table 11 shows the steps necessary when displaying a portion of the page image on the workscreen 140 without modifying it. This is used when panning or zooming to display a different portion of the page image than that currently displayed.

Table 11 Notes

1) If the ADCT+ system is already in expansion mode, this step can be omitted.

EXAMPLE 12

Composite Graphics to Workscreen

Table 12 shows the steps necessary when directly compositing WYSIWYG object graphics to the workscreen 140. This process would normally be done as part of an interactive image composition sequence, building a display list which can later be rendered to the page image. The number of layers of graphic objects that can be composited in one pass is limited only by available render list memory 397. Compositing to the workscreen 140 has fewer constraints than compositing to the page image, as both horizontal and vertical runs are available, and compositing can proceed in any scan-line order, as long as the viewing order of the objects is maintained.

Table 12 Notes

1) The rendering of object based images can overlap all of the previous stages until the graphics engine commands 312 for those objects are required for compositing.

2) Compositing to the workscreen 140 is not limited to eight-line blocks. Compositing can also occur either horizontally or vertically. Compositing can occur in any order, as long as the viewing order of objects is maintained (using painter's algorithm).

EXAMPLE 13

Composite File to Screen Using File Matte

Table 13 shows the steps necessary when directly compositing ADCT+ files to the workscreen 140 using a file matte. This process would normally be done as part of an interactive image composition sequence, building a display list which can later be rendered to the page image. Note that this general method is necessary when compositing to the workscreen 140 using a matte, but the faster method of directly writing the image to the workscreen 140 using the pan-zoom engine 350 can be used where the image is rectangular and there is no matte involved.

Table 13 Notes

1) The JPEG chip 415 needs to be set up in expansion mode only once, as no compression is used.

2) A software zoom is required, as the Pan-zoom engine 350 cannot be used for compositing. In this case, a quick non-antialiased zoom is used.

EXAMPLE 14

Writing Files to Workscreen Without Matte

Table 14 shows the steps necessary when directly writing an ADCT+ file to the workscreen 140 where the image is rectangular and there is no ADCT+ matte or object matte involved. This is the fastest method, as the Pan-zoom engine 350 is used. This process would normally be done as part of an interactive image composition sequence, building a display list which can later be rendered to the page image.

Table 14 Notes

1) As only one file is being written to the screen, the render pipeline may not always be used, and the process may occur under the direct command of other software.

2) The JPEG chip 415 needs to be set up in expansion mode only once, as no compression is used.

3) The Pan-zoom controller 350 must be set up so that the destination addresses are those of the region of the screen that the image is to appear. The Pan-zoom controller 350 also performs a clipping function.

EXAMPLE 15

Composite File to Screen Using Object Matte

Table 15 shows the steps necessary when directly compositing ADCT+ files to the workscreen using an object based matte. This process would normally be done as part of an interactive image composition sequence, building a display list which can later be rendered to the page image. Note that this general method is necessary when compositing to the workscreen 140 using a matte, but the faster method of directly writing the image to the workscreen 140 using the pan-zoom engine 350 can be used where the image is rectangular and there is no matter involved. This method is suitable when the object matte is simple. For object mattes containing multiple layers of overlapping transparency see the sequence on "compositing with complex object mattes".

Table 15 Notes

1) The JPEG chip 415 needs to be set up in expansion mode only once, as no compression is used.

2) A software zoom is required, as the Pan-zoom engine 350 cannot be used for compositing. In this case, a quick non-antialiased zoom is used.

EXAMPLE 16

Test Scan

Table 16 shows the configuration used when the user wishes to see the result of a scan without saving a file to disk 120. This will usually be in order to position the scanned image correctly. This process does not produce a "destination" ADCT+ image.

EXAMPLE 17

Scan an A3 Image

Table 17 shows scanning and compressing of an image from the Colour Copier scanner 152. The colour copier 150 only supports one scan mode, which is to scan an entire A3 image. Where smaller images are required, these should be trimmed from the A3 page using the scan and trim sequence.

EXAMPLE 18

Scan, Trim and File an Image

The scanned data is always the entire A3 page. However, in most cases the image actually required will be smaller than the complete A3 page, and it is desirable to be able to save just the portion required.

The procedure to achieve this is shown in Table 18 and is to scan and compress the complete image, expand the scanned image, select the region that is desired as the final image, compress this region, and write the compressed image to disk. ADCT+ file sizes must be in increments of 8×8 pixel cells. So that no further image degradation occurs when expanding and re-compressing the scanner image, the image cells are not moved in the process of trimming an image. Therefore, the ADCT+ file size will be rounded out to the nearest 8×8 pixel cell on all four sides of the image. This method can only produce rectangular images. Where it is desirable that the shape of the picture is other than rectangular, a file matte should be created.

Table 18 Notes

1) The Test Scan is performed as many times as is required by the user to align the image on the scanner and set the scanner controls to the desired values.

2) The file expanded is the scanner file in the Destination image memory 391. As is usually the case, the destination memory 391 is treated as the source memory 392 for expansion. The Source and destination normally share approximately the same memory space 420.

3) The compression line size and start address will usually vary from that used in expansion.

The foregoing describes only a number of embodiments of the present invention and modifications, obvious to those skilled in the art can be made thereto without departing from the scope of the present invention.

TABLE 1

COMPOSITE LAYERS OF OBJECTS WITH IMAGE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Workscreen 140 | Notes | Comments |
|---|---|---|---|---|---|---|---|---|---|---|---|---|---|
| CDL |  |  |  |  |  |  |  |  |  |  |  |  | Application |
| CRL |  |  |  |  |  | CRL |  |  |  |  |  |  | Host render |
|  |  |  |  | This section repeated for each 8 line block |  |  |  |  |  |  |  |  |  |
|  | RBO | LHE |  |  | LHE | LHE |  |  |  |  |  | 1 |  |
|  | RBO | EPI |  | EPI | EPI | EPI |  |  |  |  |  | 1 | Expand page |
|  | RBO | LHC | COI | COI | LHC | LHC |  |  |  |  |  | 1,2 | Object 1 |
|  | RBO |  | COI | COI |  |  |  |  |  |  |  | 1 | Object 2 |
|  | RBO |  | ↓ⱼ | ↓ |  |  |  |  |  |  |  | 1 | ↓ |
|  |  |  | COI | COI |  |  |  |  |  |  |  |  | Object n |
|  |  | CPI |  | CPI | CPI | CPI |  |  |  |  |  |  | Compress |
|  |  |  |  | End of repeated section |  |  |  |  |  |  |  |  |  |

TABLE 2

COMPOSITE FILE USED IMAGE MATTE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| CDL | | | | | | | | | | | | | Application |
| CRL | | | | | CRL | | | | | | | | Host render |
| | | | | This section repeated for each 8 line block | | | | | | | | | |
| | | LHE | | | LHE | LHE | | | | | | | |
| | | EPI | | EPI | EPI | EPI | | | | | | | Expand page |
| | | EFI | | EFI | EFI | EFI | | | | | | | File Image |
| | | EFM | | EFM | EFM | EFM | | | | | | | Matte |
| | | BIM | | BIM | | BIM | | | | | | | |
| | | FIM | FIM | | | FIM | | | | | | | |
| | | LHC | CFF | CFF | LHC | LHC | | | | | | 1 | Composite |
| | | CPI | | CPI | CPI | CPI | | | | | | | Compress |
| | | | | End of repeated section | | | | | | | | | |

TABLE 3

COMPOSITE FILE USING PAGE MATTE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| CDL | | | | | | | | | | | | | Application |
| CRL | | | | | CRL | | | | | | | | Host render |
| | | | | This section repeated for each 8 line block | | | | | | | | | |
| | | LHE | | | LHE | LHE | | | | | | | |
| | | EPI | | EPI | EPI | EPI | | | | | | | Expand page |
| | | EPM | | EPM | EPM | EPM | | | | | | | Page matte |
| | | EFI | | EFI | EFI | EFI | | | | | | | File Image |
| | | BFI | | BFI | | BFI | | | | | | | |
| | | FFI | FFI | | | | | FFI | | | | | |
| | | LHC | CFP | CFP | LHC | LHC | | | | | | 1 | Composite |
| | | CPI | | CPI | CPI | CPI | | | | | | | Compress |
| | | | | End of repeated section | | | | | | | | | |

TABLE 4

COMPOSITE FILE USING BOTH MATTE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| CDL | | | | | | | | | | | | | Application |
| CRL | | | | | CRL | | | | | | | | Host render |
| | | | | This section repeated for each 8 line block | | | | | | | | | |
| | | LHE | | | LHE | LHE | | | | | | | |
| | | EPI | | EPI | EPI | EPI | | | | | | | expand page |
| | | EPM | | EPM | EPM | EPM | | | | | | | Page matte |
| | | EFI | | EFI | EFI | EFI | | | | | | | File Image |
| | | EFM | | EFM | EFM | EFM | | | | | | | File Matte |
| | | BIM | | BIM | | BIM | | | | | | | |
| | | FIM | FIM | | | FIM | | | | | | | |
| | | LHC | CBM | CBM | LHC | LHC | | | | | | 1 | Composite |
| | | CPI | | CPI | CPI | CPI | | | | | | | Compress |
| | | | | End of repeated section | | | | | | | | | |

TABLE 5

PRINT OBJECT GRAPHICS AND TEXT ONLY

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan- zoom 350 | Work- screen 140 | Notes | Comments |
|---|---|---|---|---|---|---|---|---|---|---|---|---|---|
| CDL |  |  |  |  |  |  |  |  |  |  |  |  | Application |
| CRL |  |  |  |  |  | CRL |  |  |  |  |  |  | Host render |
|  |  | LHC |  |  | LHC | LHC |  |  |  |  |  | 2 |  |
|  |  |  |  | This section repeated for each 8 line block |  |  |  |  |  |  |  |  |  |
|  | RBO |  | CCB | CCB |  |  |  |  |  |  |  | 1 | Clear page |
|  | RBO |  | COI | COI |  |  |  |  |  |  |  | 1 | Object 1 |
|  | RBO |  | COI | COI |  |  |  |  |  |  |  | 1 | Object 2 |
|  | RBO |  | ↓ | ↓ |  |  |  |  |  |  |  | 1 | ↓ |
|  |  |  | COI | COI |  |  |  |  |  |  |  |  | Object n |
|  |  | CPI |  | CPI | CPI | CPI |  |  |  |  |  |  | Compress |
|  |  |  |  | End of repeated section |  |  |  |  |  |  |  |  |  |
|  |  | LHE |  |  | LHE | LHE |  |  |  |  |  | 3 |  |
|  |  | PRN |  | PRN | PRN | PRN |  | PRN |  |  |  |  | Print |

TABLE 6

PRINT THE EXISTING PAGE IMAGE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan- zoom 350 | Work- screen 140 | Notes | Comments |
|---|---|---|---|---|---|---|---|---|---|---|---|---|---|
|  |  | LHE |  |  | LHE | LHE |  |  |  |  |  |  |  |
|  |  | PRN |  | PRN | PRN | PRN |  | PRN |  |  |  |  | Print |

TABLE 7

PRINT IMAGE, MATTE, AND GRAPHICS

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan- zoom 350 | Work- screen 140 | Notes | Comments |
|---|---|---|---|---|---|---|---|---|---|---|---|---|---|
| CDL |  |  |  |  |  |  |  |  |  |  |  |  | Application |
| CRL |  |  |  |  |  | CRL |  |  |  |  |  |  | Host render |
|  |  |  |  | This section repeated for each 8 line block |  |  |  |  |  |  |  |  |  |
|  | RBO | LHE | CCB | CCB | LHE | LHE |  |  |  |  |  | 1 | Clear page |
|  | RBO | EFI |  | EFI | EFI | EFI |  |  |  |  |  | 1 | Expand file |
|  | RBO | EFM |  | EFM | EFM | EFM |  |  |  |  |  | 1 | Exp. matte |
|  | RBO | BIM |  | BIM |  | BIM |  |  |  |  |  | 1 | Buffer file |
|  | RBO | FIM | FIM |  |  | FIM |  |  |  |  |  | 1,3 | Format file |
|  | RBO | LHC | CCF | CCF | LHC | LHC |  |  |  |  |  | 1,2,3 | File image |
|  |  |  | COI | COI |  |  |  |  |  |  |  |  | Objects |
|  |  | CPI |  | CPI | CPI | CPI |  |  |  |  |  |  | Compress |
|  |  |  |  | End of repeated section |  |  |  |  |  |  |  |  |  |
|  |  | LHE |  |  | LHE | LHE |  |  |  |  |  |  |  |
|  |  | PRN |  | PRN | PRN | PRN |  | PRN |  |  |  |  | Print |

TABLE 8

PRINT 2 IMAGES WITH OBJECT MATTES, AND TEXT

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan- zoom 350 | Work- screen 140 | Notes | Comments |
|---|---|---|---|---|---|---|---|---|---|---|---|---|---|
| CDL |  |  |  |  |  |  |  |  |  |  |  |  | Application |
| CRL |  |  |  |  |  | CRL |  |  |  |  |  |  | Host render |
|  |  |  |  | This section repeated for each 8 line block |  |  |  |  |  |  |  |  |  |
|  | RBM | LHE | CCB | CCB | LHE | LHE |  |  |  |  |  | 1 | Clear page |
|  | RBM | EFI |  | EFI | EFI | EFI |  |  |  |  |  | 1 | File 1 |

TABLE 8-continued

PRINT 2 IMAGES WITH OBJECT MATTES, AND TEXT

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| | RBM | BFI | | BFI | | BFI | | | | | | 1 | File 1 |
| | RMF | RMF | RMF | | | RMF | | | | | | 1 | Matte 1 |
| | RBM | | CFO | CFO | | | | | | | | 2 | Composite |
| | RBM | EFI | | EFI | EFI | EFI | | | | | | 2 | File 2 |
| | RBM | BFI | | BFI | | BFI | | | | | | 2 | File 2 |
| | RMF | RMF | RMF | | | RMF | | | | | | 2 | Matte 2 |
| | RBO | LHC | CFO | CFO | LHC | LHC | | | | | | 3 | Composite |
| | | | COI | COI | | | | | | | | | Text |
| | | CPI | | CPI | CPI | CPI | | | | | | | Compress |
| | | | | End of repeated section | | | | | | | | | |
| | | LHE | | | LHE | LHE | | | | | | | |
| | | PRN | | PRN | PRN | PRN | | PRN | | | | | Print |

TABLE 9

PRINT 2 IMAGES WITH FILE MATTES, AND TEXT

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| | RBO | LHE | CCB | CCB | | LHE | LHE | | | | | 1 | |
| CDL | | | | | | | | | | | | | Application |
| CRL | | | | | | CRL | | | | | | | Host render |
| | | | | This section repeated for each 8 line block | | | | | | | | | |
| | RBO | LHE | CCB | CCB | LHE | LHE | | | | | | 1 | Clear page |
| | RBO | EFI | | EFI | EFI | EFI | | | | | | 1 | File 1 |
| | RBO | EFM | | EFM | EFM | EFM | | | | | | 1 | Matte 1 |
| | RBO | BIM | | BIM | | BIM | | | | | | 1 | |
| | RBO | FIM | FIM | | | FIM | | | | | | 1 | |
| | RBO | | CFM | CFM | | | | | | | | 1 | Comp. 1 |
| | RBO | EFI | | EFI | EFI | EFI | | | | | | 1 | File 2 |
| | RBO | EFM | | EFM | EFM | EFM | | | | | | 1 | Matte 2 |
| | RBO | BIM | | BIM | | BIM | | | | | | 1 | |
| | RBO | FIM | FIM | | | FIM | | | | | | 1 | |
| | RBO | LHC | CFM | CFM | LHC | LHC | | | | | | 1 | Comp. 2 |
| | | | COI | COI | | | | | | | | | Text |
| | | CPI | | CPI | CPI | CPI | | | | | | | Compress |
| | | | | End of repeated section | | | | | | | | | |
| | | LHE | | | LHE | LHE | | | | | | | |
| | | PRN | | PRN | PRN | PRN | | PRN | | | | | Print |

TABLE 10

PRINT 3 OPAQUE RECTANGULAR IMAGES AND TEXT

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| CDL | | | | | | | | | | | | | Application |
| CRL | | | | | | CRL | | | | | | | Host render |
| | | | | This section repeated for each 8 line block | | | | | | | | | |
| | RBO | LHE | CCB | CCB | LHE | LHE | | | | | | 1 | Clear page |
| | RBO | FWI | | FWI | FWI | FWI | | | | | | 1,2 | File 1 |
| | RBO | FWI | | FWI | FWI | FWI | | | | | | 1,2 | File 2 |
| | RBO | FWI | | FWI | FWI | FWI | | | | | | 1,2 | File 3 |
| | | LHC | COI | COI | LHC | LHC | | | | | | 3 | Text |
| | | CPI | | CPI | CPI | CPI | | | | | | | Compress |
| | | | | End of repeated section | | | | | | | | | |
| | | LHC | | | LHE | LHE | | | | | | | |
| | | PRN | | PRN | PRN | PRN | | PRN | | | | | Print |

TABLE 11

ZOOM TO WORKSCREEN

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
|  |  | LHE |  |  | LHE | LHE |  |  |  |  |  | 1 |  |
|  |  | ZTW |  | ZTW | ZTW | ZTW |  |  |  | ZTW | ZTW |  | Zoom page |

TABLE 12

COMPOSITE GRAPHICS TO WORKSCREEN

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| CDL |  |  |  |  |  |  |  |  |  |  |  |  | Application |
| CRL |  |  |  |  |  | CRL |  |  |  |  |  |  | Host render |
|  |  |  |  | This section repeated for each 8 line block |  |  |  |  |  |  |  |  |  |
|  | RBO |  |  |  |  |  |  |  |  |  |  | 1 |  |
|  | RBO |  | CTW | CTW |  |  |  |  |  |  |  | 1,2 | Object 1 |
|  | RBO |  | CTW | CTW |  |  |  |  |  |  |  | 1,2 | Object 2 |
|  | RBO |  | ↓ | ↓ |  |  |  |  |  |  |  | 1,2 | ↓ |
|  |  |  | CTW | CTW |  |  |  |  |  |  |  | 2 | Object n |
|  |  |  |  | End of repeated section |  |  |  |  |  |  |  |  |  |

TABLE 13

COMPOSITE FILE TO SCREEN USING FILE MATTE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| CDL |  |  |  |  |  |  |  |  |  |  |  |  | Application |
| CRL |  |  |  |  |  | CRL |  |  |  |  |  |  | Host render |
|  |  | LHE |  |  | LHE | LHE |  |  |  |  |  | 2 |  |
|  |  |  |  | This section repeated for each 8 line block |  |  |  |  |  |  |  |  |  |
|  |  | EFI |  | EFI | EFI | EFI |  |  |  |  |  | 1 | File |
|  |  | EFM |  | EFM | EFM | EFM |  |  |  |  |  |  | Matte |
|  |  | BIM |  | BIM |  | BIM |  |  |  |  |  |  |  |
|  | QSZ |  |  |  |  | QSZ |  |  |  |  |  | 2 | Zoom |
|  |  | FIM |  | FIM |  | FIM |  |  |  |  |  |  |  |
|  |  |  |  | CTW |  |  |  |  |  |  | CTW |  | Composite |
|  |  |  |  | End of repeated section |  |  |  |  |  |  |  |  |  |

TABLE 14

WRITING FILES TO WORKSCREEN WITHOUT MATTE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| CDL |  |  |  |  |  |  |  |  |  |  |  | 1 | Application |
| CRL |  |  |  |  |  | CRL |  |  |  |  |  | 1 | Host render |
|  |  | LHE |  |  | LHE | LHE |  |  |  |  |  | 2 |  |
|  |  |  |  | This section repeated for each 8 line block |  |  |  |  |  |  |  |  |  |
|  |  | ZTW |  | ZTW | ZTW | ZTW |  |  |  | ZTW | ZTW | 3 | Zoom page |
|  |  |  |  | End of repeated section |  |  |  |  |  |  |  |  |  |

TABLE 15

COMPOSITE FILE TO SCREEN USING OBJECT MATTE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| CDL | | | | | | | | | | | | | Application |
| CRL | | | | | CRL | | | | | | | | Host render |
| | | LHE | | | LHE | LHE | | | | | | 1 | |
| | | | | This section repeated for each 8 line block | | | | | | | | | |
| | | EFI | | EFI | EFI | EFI | | | | | | | File |
| | | BFI | | BFI | | BFI | | | | | | | |
| | QSZ | | | | | | | | | | | 2 | Zoom |
| | RMF | RMF | RMF | | | RMF | | | | | | 3 | |
| | | | CTW | | | | | | | | CTW | | Composite |
| | | | | End of repeated section | | | | | | | | | |

TABLE 16

TEST SCAN

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| | | LHC | | | LHC | LHC | | | | | | | |
| | | STW | | STW | STW | STW | STW | | | | | | Scan |

TABLE 17

SCAN AN A3 IMAGE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| | | LHC | | | LHC | LHC | | | | | | | |
| | | SCN | | SCN | SCN | SCN | SCN | | | | | | Scan |

TABLE 18

SCAN, TRIM AND FILE AN IMAGE

Processing steps

| G.P. processor 230 | Render processor 310 | Render Processor DMA | Graphics engine 320 | Compositing store 330 | ADCT+ 340 | DRAM 420 | Scanner 152 | Printer 154 | Disk 120/ Network 105 | Pan-zoom 350 | Work-screen 140 | Notes | Comments |
|---|---|---|---|---|---|---|---|---|---|---|---|---|---|
| | | LHC | | | LHC | LHC | | | | | | | |
| | | SCN | | SCN | SCN | SCN | SCN | | | | | | Scan |
| | | | | This section repeated for each 8 line block | | | | | | | | | |
| | | LHE | CCB | CCB | LHE | LHE | | | | | | | Clear page |
| | | EFI | | EFI | EFI | EFI | | | | | | 1 | Expand |
| | | LHC | | | LHC | LHC | | | | | | | |
| | | CFI | | CFI | CFI | CFI | | | | | | 2 | Compress |
| | | | | end of repeated section | | | | | | | | | |
| WAD | | | | | | | | | WAD | | | | Write file |

What is claimed is:

1. A method of creating an image characterized in that the image is formed as a plurality of bands, the bands being formed independently of data included in the bands, with each of the bands representing an independently displayable portion of the image, in which multiple passes over the bands are used to manipulate the image, wherein each of the bands is stored as independent compressed pixel image data such that each of the bands is configured for independent manipulation through at least decompression of the band, and wherein said manipulation comprises at least compositing the decompressed pixel data of at least one decompressed band with one or more further bands of pixel data prior to recompressing the composited pixel data of the decompressed band.

2. A method according to claim 1, wherein manipulation of the image comprises:
  (a) rendering the decompressed pixel data of at least one of said bands; and
  (b) editing the decompressed pixel data of at least one decompressed band by altering the value of one or more portions of the decompressed pixel data of the band prior to recompressing the altered pixel data of the decompressed band.

3. A method of creating an image formed as a plurality of bands, the bands being formed independently of data included in the bands, with each of the bands representing an independently displayable portion of the image, said method comprising the steps of:
  (a) storing each of the bands as independently compressed pixel image data; and
  (b) manipulating one or more bands of the image by effecting multiple passes over the bands, wherein each of the bands is configured for independent manipulation through at least decompression of the band, and wherein, said manipulation comprise at least compositing the decompressed pixel data of at least one decompressed band with one or more further bands of pixel data prior to recompressing the composited pixel data of the decompressed band.

4. A method according to claim 3, wherein for each band a corresponding compressed band is formed at step (a).

5. A method according to claim 3, wherein step (b) comprises the sub-steps of:
  (b1) decompressing at least one compressed band of pixel image data;
  (b2) editing the at least one decompressed band by altering the value of one or more portions of the decompressed pixel data of said at least one decompressed band;
  (b3) compressing the at least one edited decompressed band; and
  (b4) storing the at least one compressed edited band.

6. A method according to claim 5, wherein steps (b1), (b3) and (b4) are each performed on one band at a time.

7. A method according to claim 6, wherein step (b2) is performed on one band at a time.

* * * * *

UNITED STATES PATENT AND TRADEMARK OFFICE
CERTIFICATE OF CORRECTION

| | |
|---|---|
| PATENT NO. | : 7,012,620 B1 |
| APPLICATION NO. | : 09/369281 |
| DATED | : March 14, 2006 |
| INVENTOR(S) | : Kia Silverbrook |

It is certified that error appears in the above-identified patent and that said Letters Patent is hereby corrected as shown below:

<u>On the title page</u>
    At Item (56), U.S. Patent Documents, insert
        --5,638,464  6/1997  Kawamura ..... 382/232--.

<u>Column 4</u>
    Line 63, "temporary" should read --temporarily--.

<u>Column 9</u>
    Line 37, "typically(take" should read --typically take--.

<u>Column 12</u>
    Line 2, "330,address" should read --330 address--.

<u>Column 13</u>
    Line 36, "n" should read --in--.
    Line 43, "et" should read --set--.

<u>Column 14</u>
    Line 38, "tore" should read --store--.

<u>Column 16</u>
    Line 25, "FFT" should read --FFI--.

<u>Column 19</u>
    Line 17, "The only" should begin a new paragraph.
    Line 49, "memory 420" should read --memory 420,--.

<u>Column 23</u>
    Line 1, "be" should be deleted.
    Line 3, "only be" should read --only by--.

<u>Column 24</u>
    Line 16, "only be" should read --only by--.

<u>Column 27</u>
    Line 20, "matter" should read --matte--.

UNITED STATES PATENT AND TRADEMARK OFFICE
CERTIFICATE OF CORRECTION

PATENT NO. : 7,012,620 B1
APPLICATION NO. : 09/369281
DATED : March 14, 2006
INVENTOR(S) : Kia Silverbrook It is certified that error appears in the above-identified patent and that said Letters Patent is hereby corrected as shown below:

<u>Column 37</u>
 Line 12, Table 15, column DRAM, between BFI (Line 11) and RMF (Line 13), --QSZ-- should be inserted.

<u>Column 40</u>
 Line 1, "comprise" should read --comprises--.

Signed and Sealed this

Twenty-second Day of December, 2009

David J. Kappos
*Director of the United States Patent and Trademark Office*